US012051306B2

(12) United States Patent
Amaitis et al.

(10) Patent No.: US 12,051,306 B2
(45) Date of Patent: Jul. 30, 2024

(54) SYSTEMS AND METHODS FOR INTERPROCESS COMMUNICATION OF WAGERING OPPORTUNITIES AND/OR WAGER REQUESTS

(71) Applicant: CFPH, LLC, New York, NY (US)

(72) Inventors: Lee M. Amaitis, New York, NY (US); Andrew Garrood, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/219,787

(22) Filed: Jul. 10, 2023

(65) Prior Publication Data

US 2023/0351857 A1 Nov. 2, 2023

Related U.S. Application Data

(63) Continuation of application No. 17/892,475, filed on Aug. 22, 2022, now abandoned, which is a continuation of application No. 12/979,546, filed on Dec. 28, 2010, now abandoned.

(60) Provisional application No. 61/405,354, filed on Oct. 21, 2010, provisional application No. 61/393,672, filed on Oct. 15, 2010, provisional application No. 61/380,862, filed on Sep. 8, 2010.

(51) Int. Cl.
*G07F 17/32* (2006.01)
*G06Q 50/34* (2012.01)

(52) U.S. Cl.
CPC ......... *G07F 17/3269* (2013.01); *G06Q 50/34* (2013.01); *G07F 17/3288* (2013.01)

(58) Field of Classification Search
CPC ............................ G07F 17/3288; G06Q 50/34
USPC ............................................................ 463/28
See application file for complete search history.

(56) References Cited

U.S. PATENT DOCUMENTS

| | | | | | |
|---|---|---|---|---|---|
| 6,347,086 | B1 * | 2/2002 | Strachan | G07F 17/3288 | 463/16 |
| 6,396,473 | B1 * | 5/2002 | Callahan | H04N 21/42653 | 345/530 |
| 7,148,875 | B2 * | 12/2006 | Rosenberg | G06F 1/1626 | 345/157 |
| 7,557,804 | B1 * | 7/2009 | McDaniel | G06F 3/04815 | 382/154 |
| 7,890,324 | B2 * | 2/2011 | Bangalore | G10L 15/26 | 709/228 |
| 8,085,269 | B1 * | 12/2011 | Classen | G11B 27/34 | 381/119 |
| 8,096,865 | B2 * | 1/2012 | Schugar | G07F 17/32 | 463/16 |
| 8,118,675 | B2 * | 2/2012 | Horowitz | G07F 17/32 | 463/40 |
| 8,538,563 | B1 * | 9/2013 | Barber | G07F 17/3276 | 463/28 |
| 8,540,574 | B1 * | 9/2013 | Kopra | G07F 17/3288 | 463/42 |
| 2001/0036853 | A1 * | 11/2001 | Thomas | G06Q 50/34 | 463/17 |
| 2002/0073021 | A1 * | 6/2002 | Ginsberg | A63F 3/081 | 705/38 |
| 2003/0199315 | A1 * | 10/2003 | Downes P.E. | G07F 17/3288 | 463/28 |

(Continued)

*Primary Examiner* — Chase E Leichliter

(57) ABSTRACT

Various embodiments may include offering wagering opportunities, receiving wager requests, balancing risk, determining wager requests to accepted based on risk, forming wagers based on wager request, and/or performing other actions by one or more apparatus. Further methods and apparatus are described.

18 Claims, 12 Drawing Sheets

(56) References Cited

U.S. PATENT DOCUMENTS

| | | | | |
|---|---|---|---|---|
| 2005/0003878 | A1* | 1/2005 | Updike | G06Q 50/34 463/16 |
| 2005/0181869 | A1* | 8/2005 | Downes P.E. | G07F 17/3223 463/28 |
| 2005/0209002 | A1* | 9/2005 | Blythe | A63F 13/795 463/42 |
| 2006/0246990 | A1* | 11/2006 | Downes | G07F 17/3223 463/16 |
| 2006/0287094 | A1* | 12/2006 | Mahaffey | G07F 17/32 463/28 |
| 2007/0072661 | A1* | 3/2007 | Lototski | G06F 21/566 463/1 |
| 2008/0207310 | A1* | 8/2008 | Mindes | G07F 17/3288 463/25 |
| 2009/0026706 | A1* | 1/2009 | St. Clair | G07F 17/32 700/91 |
| 2009/0228906 | A1* | 9/2009 | Kelly | H04L 51/10 345/659 |
| 2010/0093430 | A1* | 4/2010 | Andersen | G06Q 30/06 463/25 |
| 2010/0160012 | A1* | 6/2010 | Amaitis | G07F 17/3244 463/2 |
| 2010/0171267 | A1* | 7/2010 | Walker | G07F 17/322 463/43 |
| 2011/0065494 | A1* | 3/2011 | Kennedy | G07F 17/32 463/25 |
| 2011/0190045 | A1* | 8/2011 | Vassilonikolidakis | G07F 17/3288 463/25 |
| 2011/0207524 | A1* | 8/2011 | Simon | G07F 17/3288 463/25 |
| 2012/0058813 | A1* | 3/2012 | Amaitis | G07F 17/3269 463/25 |
| 2022/0398897 | A1* | 12/2022 | Amaitis | G07F 17/3269 |
| 2023/0351857 | A1* | 11/2023 | Amaitis | G07F 17/3269 |

* cited by examiner

501

SYSTEMS AND METHODS FOR INTERPROCESS COMMUNICATION OF WAGERING OPPORTUNITIES AND/OR WAGER REQUESTS

CROSS REFERENCE TO RELATED APPLICATIONS

This application is a continuation of U.S. patent application Ser. No. 17/892,475 filed Aug. 22, 2022, which is a continuation of U.S. patent application Ser. No. 12/979,546 filed Dec. 28, 2010, which claims the benefit of U.S. Provisional Application No. 61/380,862 filed Sep. 8, 2010; U.S. Provisional Application No. 61/393,672 filed Oct. 15, 2010; and U.S. Provisional Application No. 61/405,354 filed Oct. 21, 2010, each of which is incorporated by reference herein in its entirety.

DETAILED DESCRIPTION

I. Terms

Figure 1:
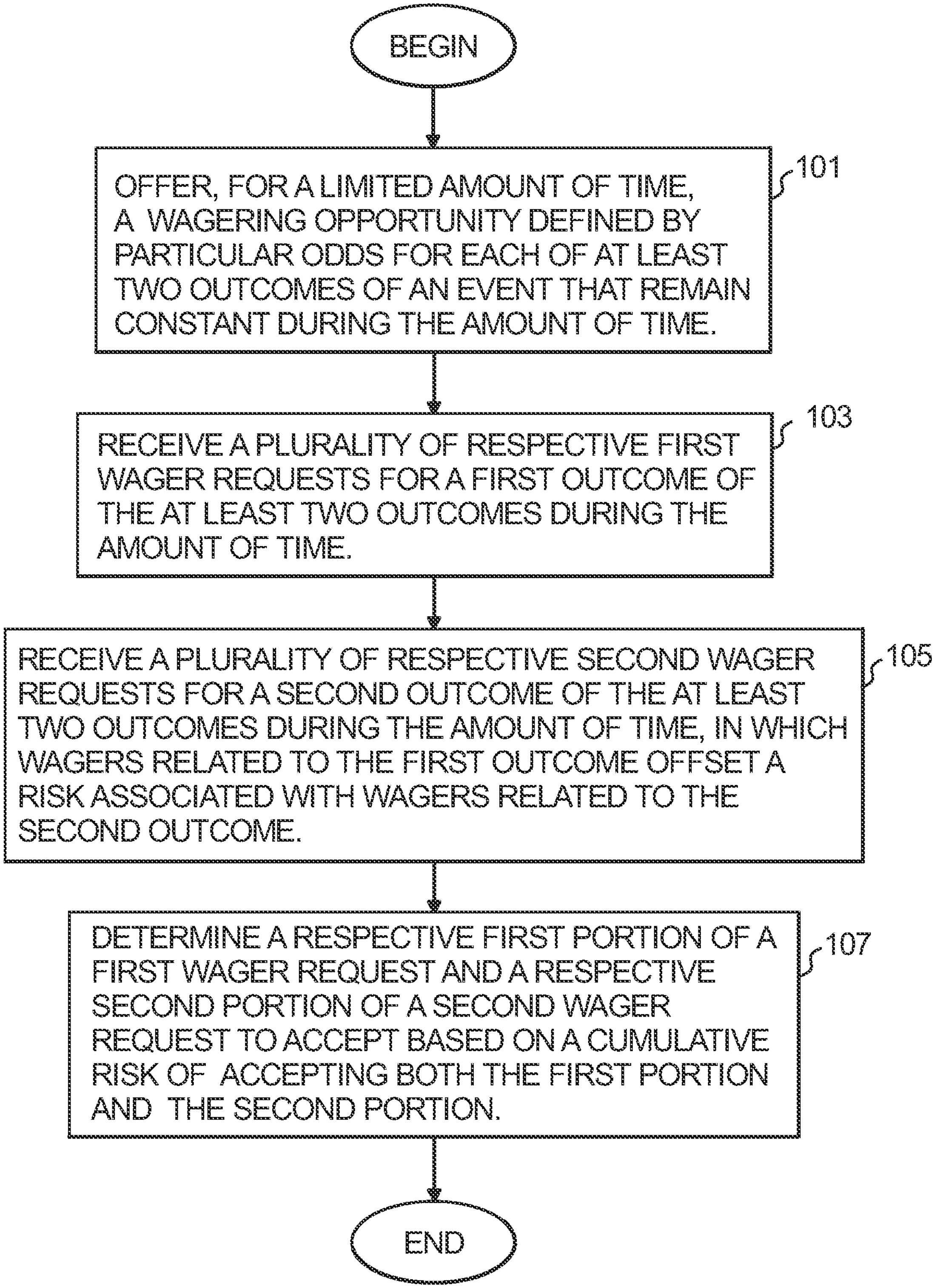
FIG. 1 illustrates an example method that may be performed in some embodiments.

The term "product" means any machine, manufacture and/or composition of matter, unless expressly specified otherwise.

The term "process" means any process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application," unless expressly specified otherwise.

The terms "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not necessarily limited to," unless expressly specified otherwise. Thus, for example, the sentence "the portfolio includes a red widget and a blue widget" means the portfolio includes the red widget and the blue widget but may include something else.

The term "consisting of" and variations thereof means "including and limited to," unless expressly specified otherwise. Thus, for example, the sentence "the portfolio consists of a red widget and a blue widget" means the portfolio includes the red widget and the blue widget but does not include anything else.

The term "compose" and variations thereof means "to make up the constituent parts of, component of, or member of," unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of," unless expressly specified otherwise. Thus, for example, the sentence "the red widget and the blue widget exclusively compose a portfolio" means the portfolio consists of the red widget and the blue widget, and nothing else.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The phrase "at least one of," when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of," when such phrase modifies a plurality of things does not mean "one of" each of the plurality of things.

Numerical terms such as "one," "two," etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget," and therefore the phrase "one widget" does not cover, e.g., two widgets.

The phrase "based on" does not mean "based only on," unless expressly specified otherwise. In other words, the phrase "based on" describes both "based only on" and "based at least on." The phrase "based at least on" is equivalent to the phrase "based at least in part on."

The term "represent" and like terms are not exclusive, unless expressly specified otherwise. For example, the term "represents" does not mean "represents only," unless expressly specified otherwise. In other words, the phrase "the data represents a credit card number" describes both "the data represents only a credit card number" and "the data represents a credit card number, and the data also represents something else."

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example," and thus does not limit the term or phrase it explains. For example, in the sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to," the mere usage of the phrase "including but not limited to" does not mean that the term "including" means something other than "including but not limited to."

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued, and canceled claims). In addition, an embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function. Where there is recited a means for performing a function that is a method, one structure for performing this method includes a computing device (e.g., a general purpose computer) that is programmed and/or configured with appropriate hardware to perform that function. Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform."

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Some Wager Examples

Some embodiments may include wagering based on one or more events. Such events may include, for example, sporting events, random events, political events, historical events, live events, outcomes of games, scores of games, outcomes of an event within a game, player performance, future events, and/or any desired event. Some embodiments may enable users to bet on the outcome of a game, e.g., which team will win, and/or by how much.

Some gaming operators (e.g., sports books) may try to determine accurate probabilities for event outcomes (e.g., win, loss, point spread) so that they can offer odds to potential bettors who may bet on the outcomes occurring. Such probabilities may be determined prior to the start of the game based on information existing prior to the game, such as historical data related to each team, player, and coaching staff, ratings, and opinions of professionals such as sports-writers and other coaches, and other public and proprietary information related to the game. For instance, some gaming operators use complicated proprietary computer algorithms to determine odds based on pre-existing statistical information and other information.

Odds for a particular event may be offered by a gaming operated. For example, a +110/−110 price for a spread of +3.5 in a Bears vs Packers game may be offered. Gaming operators may offer a single spread for such a game, and bettors that place wagers with the gaming operator may accept the offered spread at the time of the wagers being placed. The odds may change during a betting period as bettors wager on one side or another of an outcome (e.g., if many people wager that team A will win and few people wager that team B will win, the odds may become less favorable for a wager that team A will win). A spread may change during a betting period as bettors wager on one side or another of an outcome. Other information may, such as injuries, outcomes of other games, and so on may affect odds and/or spreads.

Odds may be referred to, herein and/or elsewhere, as a gaming operator's "price" to bettors for wagering on a specific outcome (wherein higher odds translate to a lower price for the bettor). This should not be confused with a commission, which may include a fee charged to a bettor for placing a wager. When there is a plurality of gaming operators offering odds on a particular outcome to a plurality of bettors, the gaming operators may compete with one another to offer a competitive price that will attract bettors who seek the highest payout for their betting dollar. Thus, gaming operators may determine odds based in part on the odds offered by competing gaming operators. Betting behavior can also affect odds. For instance, a high demand for bets that the Chicago Cubs will win their next game against the Phillies may drive up the effective price for that bet. Accordingly, as in other competitive marketplaces, odds determinations often reflect a "market price" for each game outcome, as gaming operators may adjust their odds based on the market. The effective market price can change over time as the betting market changes and new relevant information is disclosed, such as an injury of a key Cubs pitcher a day before the game. Amounts wagered by losers on one side of the bet can be used to fund the payout to winners on the other side of the bet. In large betting markets where there are many bettors on each side of a bet, gaming operators may adjust their odds in an effort to balance the potential payouts on either side of the bet. Such adjustment of odds may occur throughout a betting period for an event. Adjustment of other wager characteristics (e.g., a spread) may occur as an alternative, and/or addition.

Some gaming operators may allow users to bet on performance parameters within a game, such as whether a particular player will strike out in a particular at-bat in a baseball game. Based on the speed of such wagering options resolving and/or an amount of interest in such wagering options, gaming operator may attempt to offer odds without the benefit of a competitive betting market based on the operator's best assessment of the probabilities of the various outcomes. Some examples of such "mini game" wagers are described in U.S. patent application Ser. No. 12/497,669 to Amaitis, entitled "Computer graphics processing and display of selectable items" and filed on Jul. 4, 2009, which is hereby incorporated herein by reference.

It should be recognized that various embodiments may include any type of wager, such as, for example, in-game wagers on sports or other events, wagers on outcomes of games or other events, and so on. It should be recognized that various embodiments may include any systems and/or methods for determining initial and/or future odds for any wager. Some embodiments may include an exchanged based system, a consensus odds system that may use other sports books to determine odds, a wager line set by a sports book algorithm and/or employee, and so on. It should be recognized that various embodiments may include any system and/or method for placing and/or managing wagers, such as, for example, a centralized computer system, a distributed computer system, one or more servers, one or more client computers, an in person system, a ticket system, a mobile system, a touch pad, a mobile phone, and so on. Some examples of wager types, systems and methods for determining odds, and systems and methods for placing and managing wagers are described in U.S. patent application Ser. No. 12/258,297 to Storm and entitled Wager Market Creation and Management and/or U.S. patent application Ser. No. 12/687,980 to Amaitis, entitled "Electrical computers and digital processing systems involving interprogram or interprocess communication regarding amusement devices and games" filed Jan. 15, 2010, which are both hereby incorporated herein by reference.

Some embodiments may include wagers on one or more competitions. Some example competitions on which a wager may be placed at a sports book may include auto racing, baseball, basketball, boxing, football, golf, hockey, and horse racing. Each competition type may have a different set of odds and/or other characteristics associated therewith. Some examples are given below. These examples are non-limiting examples only. These examples may not include commissions that may also be charged in some embodiments.

In auto racing, for example, some number of individual drivers and/or a field (e.g., other) option may be available for wagering. Each individual driver and/or the field may be associated with some odds for each type of bet. For example, Jeff Gordon may be listed at 4-1, Jeff Burton at 15-1, Casey Atwood at 100-1, etc. If a bettor bets $10 on Burton 15-1 and Burton goes on to win the race, the bettor may win $150 plus his or her $10 back, for a total payoff of $160. Matchup wagers may be available in which two or more drivers are paired against each other in a head-to-head wager. Odds for such a wager may also be provided. For example, a matchup may pit Dale Jarrett (−145) against Bobby Labonte (+125). If a bettor bets $145 on the favored Jarrett, the payoff may be $100 plus his or her $145 back, for a total of $245. If a bettor bets $100 on the underdog Labonte, the payoff may be $125 plus his or her $100 back, for a total of $225. Various other wagers may also be available such as, for example, an over/under on a number of cautions in a race, a car manufacturer that will win the race, in-game wagers, and so on.

In baseball, for example, options may be available for team matchups with odds associated with each team of each matchup. If a team on which a wager is placed wins a matchup, the payout to the winner may vary according to the odds. In some embodiments, baseball odds may include a money line.

In a money line, odds may be based on some dollar value (e.g., $1). In a money line, a "minus" preceding a number may indicate the team is a favorite. A "plus" preceding a number may indicate the team is an underdog. For example, if the Braves' odds are −120, this may mean that a $12 bet would win $10, for a return of $22. As another example, if the Dodgers' odds are +110, this may mean that a $10 bet would win $11, for a return of $21. Various types of money lines exist, such as dime lines and 20-cent lines and may be used in various embodiments. Some embodiments may include various other wagers, such as, for example, an over under on a total runs scored, a run line, a parlay in which a bettor may select multiple teams to win, in-game wagers, and so on.

Money lines may change as wagering proceeds at some gaming operators. In some embodiments, an odds determined by the money line at the time of a wager may be the odds used to payout a wager at the end of a wager. In some embodiments, the money line at the end of a wagering period may be used to determine the odds of wager even if the money line was different when the wager was placed.

In basketball, for example, options similar to baseball options may be available. In some embodiments, a point spread may be used so that a bet on a team to win may win if the team wins by the point spread. In some embodiments, the odds may be the same for some wagers, but the point spread may be changed. For example, a point spread may increase as more bettors wager on a team to win, similar to a change in the odds discussed above with respect to baseball. Various other wagers may be included in some embodiments, such as parlays, over under on point totals, in game wagers, and so on.

In boxing, money line options similar to a baseball wagering options may be available. In hockey and football, for example, wagering options similar to basketball options may be available.

In golf, for example, options similar to auto racing may be available. For example, some number of individual golfers and a field may be available. Each option may be associated with an odds for each type of bet (e.g., to win a tournament). For example, Tiger Woods may be listed at 2-1, Tom Lehman at 25-1, Bob May at 100-1, etc. If a bettor bets $10 on Lehman at 25-1 and Lehman goes on to win the tournament, the bettor may win $250 plus his or her $10 back, for a total payoff of $260. Some options may include matchup propositions between two or more golfers. In some embodiments, one golfer may be matched against two or more golfers in such a proposition. Various other wagers may be included in some embodiments, such as over under on the winning score, over under on the lowest round by any golfer, over under on a finishing position of a golfer, in-game wagers, and so on.

In horse racing, for example, a wide variety of options may be available. For example, a win, place, show, across the board, exacta, quinella, trifecta, superfecta, daily double, pick six, and so on wagering options may be available as well as any in-game wagers. Each wager option may be associated with a money line such as those described above or other type of odds system.

As discussed above, some embodiments may include various events and/or propositions that may be wagered upon, such as outcomes of an election, winnings of an award, and so on. Some embodiments may include wagers on an outcome of a season of a game, a season of a television show (e.g., Survivor), and so on. Some embodiments may include wagers on other casino games (e.g., craps, blackjack, slots, poker). Such bets may include bets on individual games, bets on other people, bets on statistics of the games, bets on tournaments of such games, and so on. It should be recognized that the examples of various wager types and odds types are given as non-limiting examples only and that various embodiments may include any desired wager types and/or odds types. Some examples of wagers and/or devices that may be used to place wagers are described in U.S. patent application Ser. No. 12/759,757 to Lutnick, entitled "Game of chance systems and methods" filed Apr. 14, 2010, which is hereby incorporated herein by reference.

XII. Some Example Embodiments

Some embodiments may include offering wagering opportunities to bettors. In some embodiments, a wagering opportunity may include a time limited window through which wager requests may be submitted for wagers having a particular set of characteristics. Such wagering opportunities may include an ability to submit a wager request for a wager on one team or another team winning a game with a particular spread and/or particular odds. Such an opportunity may be offered by a gaming operator (which may also be referred to as a "house" herein and/or elsewhere) for an amount of time determined before the offering of the opportunity from a starting time with the particular spread and particular odds throughout the amount of time. In some embodiments, the gaming operator may determine which wager requests to accept when and/or after the amount of time has passed. Such determination may be based on a risk associated with such acceptance.

In some embodiments, the gaming operator may determine which wagers submitted during the amount of time for a team to win the game to accept based, at least in part, on wager requests submitted during the amount of time for an opposing team to win the game and/or an amount of risk associated accepting each such wager request. In some embodiments, the gaming operator may determine which wager requests on the opposing team to accept based, at least in part, on wager requests submitted for the team and/or an amount of risk associated with accepting each such wager request. Some embodiments may include determining wager requests to accept based on an amount of risk taken on by a gaming operator from prior accepted wager requests (e.g., through a sports book and/or through prior offered wagering opportunities).

In some embodiments, wager requests that are determined to be accepted, in whole and/or in part, may be accepted and/or formed into binding wagers. In some embodiments, wager requests that are determined not to be accepted may be rejected, in whole and/or in part. Various such opportunities may be provided with desired odds, desired spreads, desired amounts of times, desired starting times, and so on for a single game, a variety of games, and/or a variety of wagering options.

FIG. 1 illustrates an example method that may be performed in some embodiments. Such a method may be performed by one or more computing devices (e.g., servers operated by a gaming operator) in any combination as desired. Such a method may include offering, for a limited amount of time, a wagering opportunity defined by particular odds for each of at least two outcomes of an event that remain constant during the amount of time (e.g., 101). Such a method may include receiving a plurality of respective first wager requests for a first outcome of the at least two outcomes during the amount of time (e.g., 103). Such a method may include receiving a plurality of respective second wager requests for a second outcome of the at least two outcomes during the amount of time, in which wagers related to the first outcome offset a risk associated with wagers related to the second outcome (e.g., 105). Such a method may include determining a respective first portion of a first wager request and a respective second portion of a second wager request to accept based on a cumulative risk of accepting both the first portion and the second portion (e.g., 107). It should be recognized that such a method is given as an example only and that other embodiments may include similar, different, no, more, fewer, alternative, differently ordered, and so on methods and/or actions.

XIII. Offering a Wagering Opportunity

As previously mentioned, some embodiments may include offering a wagering opportunity to one or more bettors. FIG. 1 element 101 shows an example action of offering a wagering opportunity that may be performed in some embodiments. A wagering opportunity may be defined by one or more characteristics and/or be offered according to any desired actions.

Figure 2:
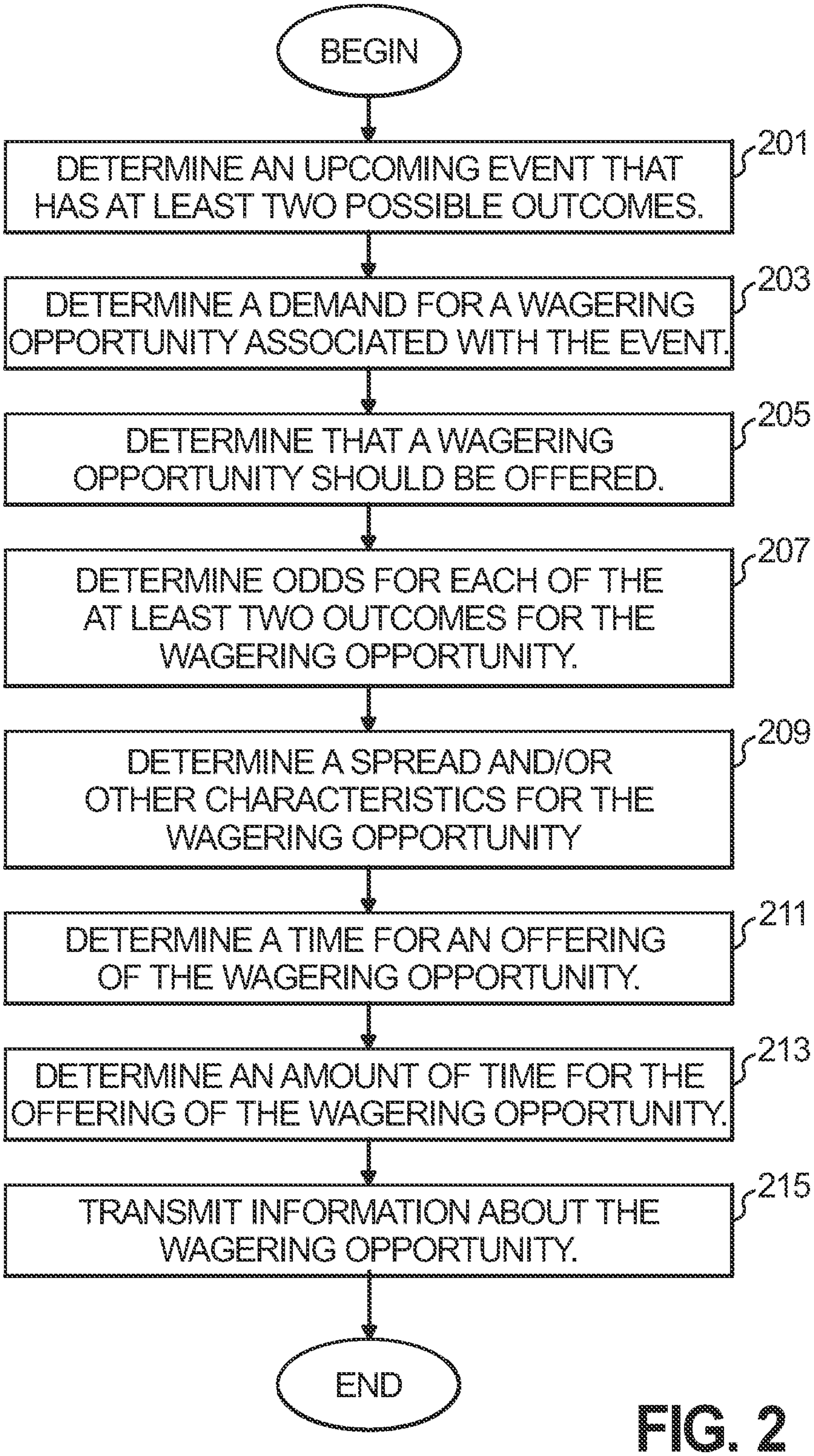
FIG. 2 illustrates an example method of determining a wagering opportunity that may be performed in some embodiments.

FIG. 2 illustrates an example method that may be performed in some embodiments to offer a wagering opportunity. Such a method may be performed by one or more computing devices (e.g., servers operated by a gaming operator) in any combination as desired. Some embodiments may include determining an upcoming event that has at least two possible outcomes (e.g., 201). Some embodiments may include determining a demand for a wagering opportunity associated with the event (e.g., 203). Some embodiments may include determining that a wagering opportunity should be offered (e.g., 205). Some embodiments may include determining odds for each of the at least two outcomes for the wagering opportunity (e.g., 207). Some embodiments may include determining a spread and/or other characteristics for the wagering opportunity (e.g., 209). Some embodiments may include determining a time for an offering of the wagering opportunity (e.g., 211). Some embodiments may include determining an amount of time for the offering of the wagering opportunity (e.g., 213). Some embodiments may include transmitting information about the wagering opportunity (e.g., 215). It should be recognized that such a method is given as an example only and that other embodiments may include similar, different, no, more, fewer, alternative, differently ordered, and so on methods and/or actions.

Some embodiments may include determining one or more characteristics for a wagering opportunity. Such characteristics may include, for example, one or more events for a wagering opportunity (e.g., 205), one or more outcomes of an event for a wagering opportunity, a start time for an offering of a wagering opportunity (e.g., 211), an amount of time for an offering of a wagering opportunity (e.g., 213), an end time for an offering of a wagering opportunity, a price and/or odds for a wagering opportunity (e.g., 207), a spread for a wagering opportunity (e.g., 209), and/or any other characteristics that may define a wagering opportunity.

In some embodiments, determining one or more events for a wagering opportunity may include choosing an event on which to offer a wager. Such a determination may be based on a demand for such a wagering opportunity as indicated at 205, based on a time of the event, and/or based on any other element characteristic of an event, and so on. Some embodiments may include determining one or more possible events on which to base a wagering opportunity (e.g., 201). Such possible events may include, for example, all televised sports games, all major league sports games, all playoff games, and so on. Such a determination may include receiving a feed from a provider of gaming information. Some embodiments may include determining a demand for a wagering opportunity for the one or more possible events (e.g., 203). Such a determination may include determining a number of people that may be located in an area associated with wagering on the event, determining a prior interest in such wagering opportunities, determining a number of requests for such opportunities, and so on.

A determination of which wagering opportunity to offer may be made based on a perceived interest of bettors for wagers related to such an opportunity (e.g., based on received indication(s), timing of a game and/or related game, other wagers received, and so on). In some embodiments, if a customer asks for a wagering opportunity to be offered for a game, in response to receiving such a request, a gaming operator may provide such an opportunity. In some embodiments, in response to determining that a first game involving a team from a first state is occurring at a first time, a wagering opportunity for a second game involving a different team from the first state that occurs at a later time may be offered. In some embodiments, in response to determining that a wagers (e.g., a threshold number, a threshold dollar amount, an increase in wagers, etc.) related to a first game have been placed (e.g., at a traditional sports book, at a nearby sports book, etc.), a wagering opportunity for the game may be offered.

In some embodiments, a wagering opportunity may be offered for all events of a certain type (e.g., all major league baseball games, all playoff games, and so on). Any method of determining a wagering opportunity to be offered may be used and/or any event may have a wagering opportunity offered. For example, some embodiments may include determining that a wagering opportunity for an upcoming football, baseball, golf, and/or other game may be offered.

In some embodiments, determining one or more outcomes of an event for a wagering opportunity may include determining possible winners and losers for an event. For example, one outcome of a game may include Bears winning a football game between the Bears and the Packers. Another outcome of that game may include Packers winning the football game. In some embodiments, these two outcomes may be determined for the game. Various other outcomes may be determined as desired, such as point totals, in game events, player matchups, and so on. Some further non-limiting examples of such outcomes are discussed elsewhere herein. In some embodiments, an outcome may include Bears winning with a spread, and/or Bears winning without a spread.

In some embodiments, determining a start time may include determining a time at which an opportunity for making wager requests may be offered (e.g., 211). A start time may include a time at which requests for wagers having determined characteristics (e.g., a spread and/or price) may be accepted by a gaming operator. In some embodiments, determining a time may include determining more than one time. In some embodiments, a time may be determined in response to a request for the wagering opportunity. For example, a request may identify the time, and/or a request may identify that the opportunity is presently desired. A time may be determined in response to a proximity to an event occurring. A time may be determined in response to another game occurring, other wagers being placed, and so on as desired. Wager requests for wagers having such characteristics received before the start time may be ignored and/or otherwise not entertained (in some embodiments unless another wagering opportunity with same or similar characteristics may be offered when that request is received).

In some embodiments, determining an amount of time and/or an end time for an offering of a wagering opportunity may include determining when to stop accepting requests for wagers having determined characteristics (e.g., 213). Wager request for wagers having such characteristics received after that amount of time has passed from the start time and/or after the end time may be ignored and/or otherwise not entertained (in some embodiments unless another wagering opportunity with same or similar characteristics may be offered when that request is received). An end time and/or amount of time may be determined to correspond to a time that an event (e.g., a game) starts, a time when a bar closes, a time when another event ends, a time when an outcome may be determined, a standard time and/or amount of time (e.g., one hour, hourly, fifteen minutes, midnight, etc.), and so on. In some embodiments, an amount of time and/or an end time may be based on a proximity to an occurrence of an event. For example, a shorter amount of time may be determined when an event begins soon than when an event begins in a longer amount of time. Some embodiments may include determining an amount of time based on how much time remains before an event begins.

In some embodiments, determining a price and/or odds may include determining odds that may apply to request to enter into wagers for the outcomes of the event in connection with the wagering opportunity (e.g., 207). Various non-limiting examples of odds and/or prices and/or determining odds and/or prices are given herein. For example, odds for a wager may be determined in response to a request to offer a wagering opportunity with a particular odds, based on determined probabilities of one or more outcomes occurring, based on leftover demand from one or more prior wagering opportunities for one outcome occurring, based on an amount of risk for one or more of the outcomes occurring that a gaming operator is exposed to, based on a consensus of odds from one or more sports books for a same event and/or spread and/or a different event and/or spread, based on a conversion of odds for a differ spread to a determined spread, randomly, and/or in any manner desired.

In some embodiments, determining a spread for a wagering opportunity may include determining a point difference between a favored and an underdog (e.g., 209). In some embodiments, a wager for a favored to win a game may be a losing wager if the favored wins but does not win by more than and/or equal to the point difference. Such a spread may include a whole number and/or a fractional number. Various non-limiting examples of spreads and/or determining spreads are given herein. For example, spreads may be determined in response to a request to offer a wagering opportunity with a particular spread, based on other offered wagering opportunities (e.g., to offer a variety, to maintain a spread), based on wagering opportunities offered by other venues (e.g., to offer a same and/or different spread), based on leftover demand from one or more prior wagering opportunities for one outcome occurring, based on an amount of risk for one or more of the outcomes occurring that a gaming operator is exposed to, based on a consensus of spread from one or more sports books for a same event and/or a different event, based on a conversion of a spread at one odds to a spread at a different odds, based on a spread providing an odds that may be similar to a requested odds, randomly, and/or in any manner desired.

Some embodiment may include determining operational, maintenance, and/or regulatory characteristics for a wagering opportunity, such as a unique identifier, a place for storing information about wagers and/or wager request, rules for wagers and/or wager requests, and so on.

It should be recognized that various examples of determining characteristics for a wagering opportunity are given as non-limiting examples only. Some embodiments may include no such determining, determining fewer, more, different, and so on characteristics. For example, in some embodiments there may be no spread determined, odds may be even, only a single event may be used, and so on as desired. Characteristics may include backs, lays, ties, money line, with a spread, without a spread, even odds, fixed odds, over/under, point total, and/or any desired wager desired.

Some embodiments may include transmitting an indication of a wagering opportunity (e.g., 215). Such a wagering opportunity may include a wagering opportunity for which characteristics have been determined. Such a transmission may include transmitting from a computing device operated by and/or on behalf of a gaming operator to one or more monitors, mobile devices, kiosks, tickers, computers, mobile phones, and so on. In some embodiments, such a transmission may include transmitting information such as indication of some or all of the characteristics such as by an electronic message. Such a transmission may occur before a wagering opportunity being offered (e.g., to identify that a wagering opportunity may be offered at some time in the future), after a wagering opportunity has been offered (e.g., to show a history of opportunities), during an offering of a wagering opportunities (e.g., to facilitate wagering related to the opportunity), as an offering of a wagering opportunity, and so on.

Figure 4:
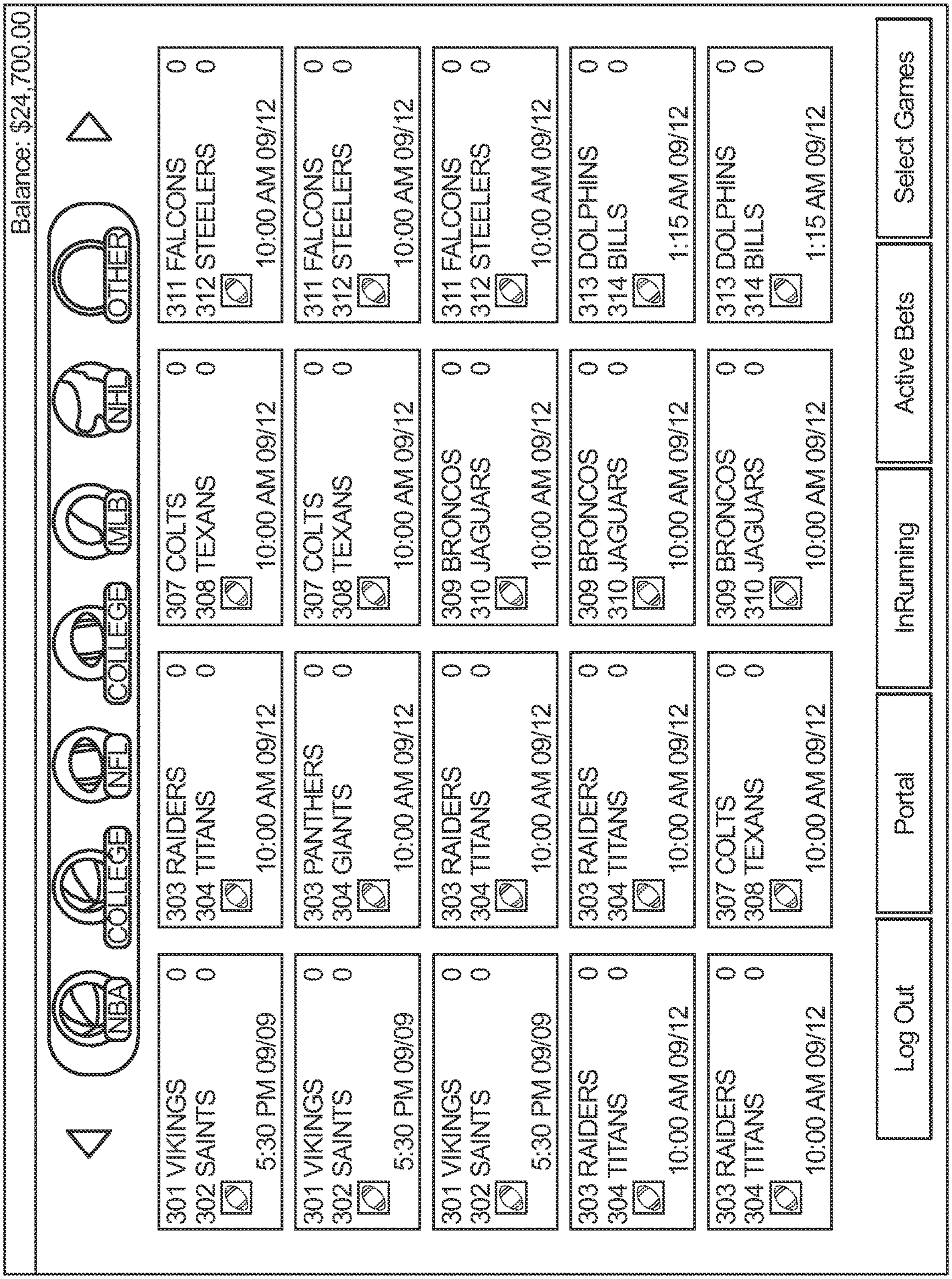
FIG. 4 illustrates an example interface that may be used in some embodiments.
Figure 5:
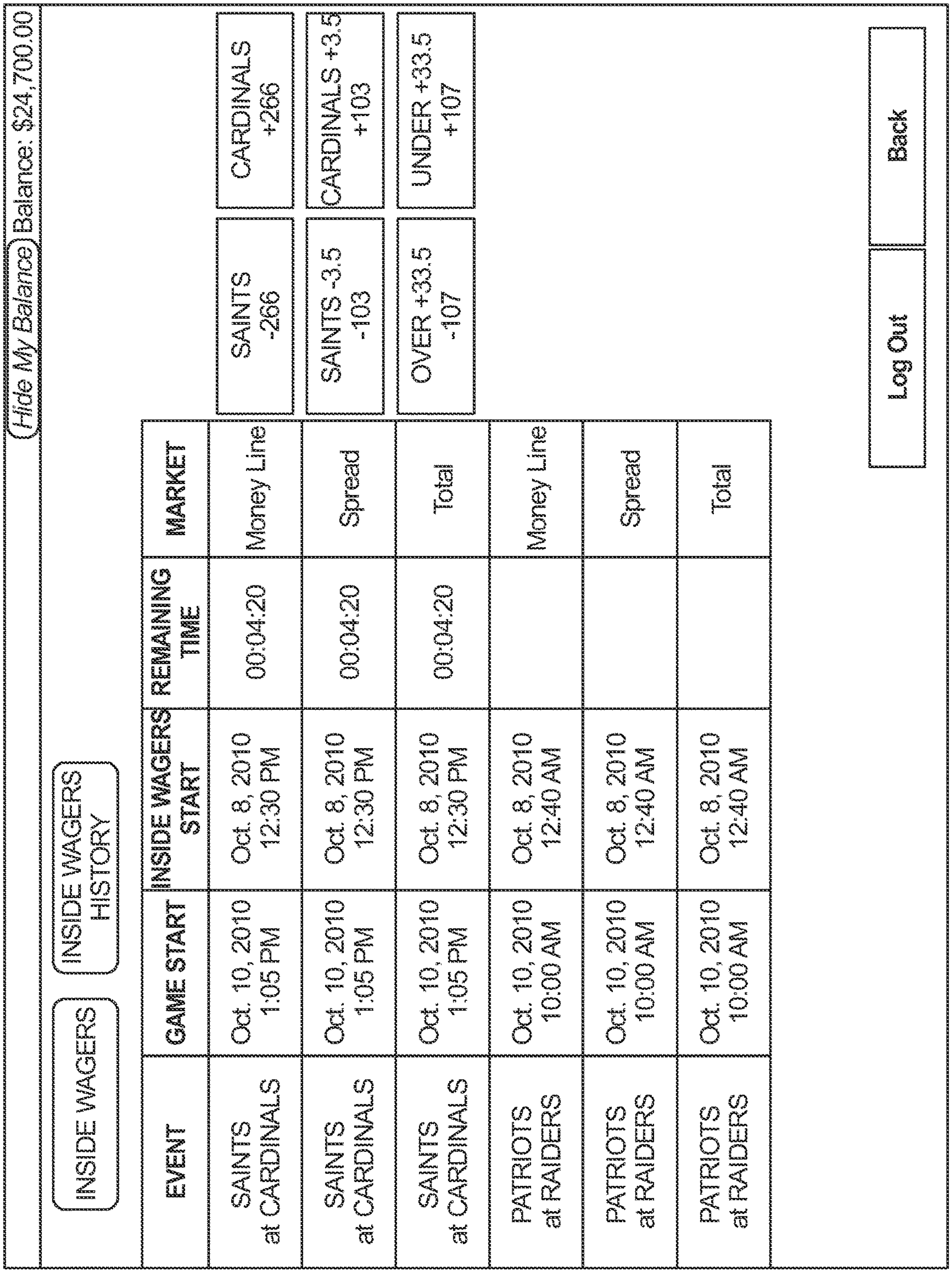
FIG. 5 illustrates an example interface that may be used in some embodiments.

In some embodiments, one or more indications of upcoming, current, and/or prior wagering opportunities may be presented to a bettor through one or more interfaces. FIGS. 4 and 5 illustrate some example interfaces for presenting information regarding wagering opportunities.

In some embodiments, information about an offered wagering opportunity may be presented to a bettor though one or more interfaces. FIGS. 4 and 5 illustrate some example interfaces for presenting information regarding wagering opportunities. For example, element 501 illustrates an example market line wager that is part of a currently offered wagering opportunity. Such information may be presented between a start time of an offering of the wagering opportunity and an end time of an offering of the wagering opportunity. Such information may include any desired information that may allow a bettor to identify the wagering opportunity (e.g., one or more of a determined characteristics, etc.). In some embodiments, a bettor may use such an interface to submit a wager request for the wagering opportunity.

In some embodiments, presenting information regarding one or more wagering opportunities may include presenting a countdown related to the wagering opportunity. Such a countdown may include an indication of an amount of time until the wagering opportunity may be offered, an amount of time remaining for an offering of a wagering opportunity, an amount of time until an event related to a wagering opportunity begins, and/or any other information.

In some embodiments, offering a wagering opportunity may include accepting wager requests, and/or otherwise facilitating the acceptance and/or making of wager requests related to a wagering opportunity during a period in which a wagering opportunity is offered. For example, such a period may include a time between a start time of a wagering opportunity and an end time of a wagering opportunity. Offering a wagering opportunity and/or accepting a wager request may include enabling a button and/or menu system to allow a bettor to enter information through an interface requesting a wager, receiving indications of such requests, maintaining information about such requests for use in determining which requests to accept, and so on as desired.

Any number of wagering opportunities may be offered at any given time. For example, multiple wagering opportunities for the same event may be offered simultaneously (e.g., with same and/or different spreads, odds, and/or other characteristics). Wagering opportunities may be offered periodically, daily, hourly, during a game, before a game, consecutively, with different characteristics, with different lengths, with decreasing lengths as an event becomes nearer, according to bettor demand, according to bettor presence, based on a time of an event occurrence, and/or in any desired manner. In some embodiments, wagering opportunities for a particular event may be offered more frequently as an event time becomes nearer.

In some embodiments characteristics of a wagering opportunity may be maintained during an offering of the wagering opportunity. For example, odds, and/or spreads may be the same for wager requests received for a particular wagering opportunity during an offering of the wagering opportunity.

XIV. Wager Requests

Some embodiments may include receiving one or more respective wager requests associated with one or more respective wagering opportunities. Elements 103 and 105 of FIG. 1 illustrate receiving wager requests. In some embodiments, a wager request may be understood as an offer to enter into an identified wager between a gaming operator (e.g., a sports book and/or house offering the opportunity) and a party submitting the wager request (e.g., a bettor).

Figure 3:
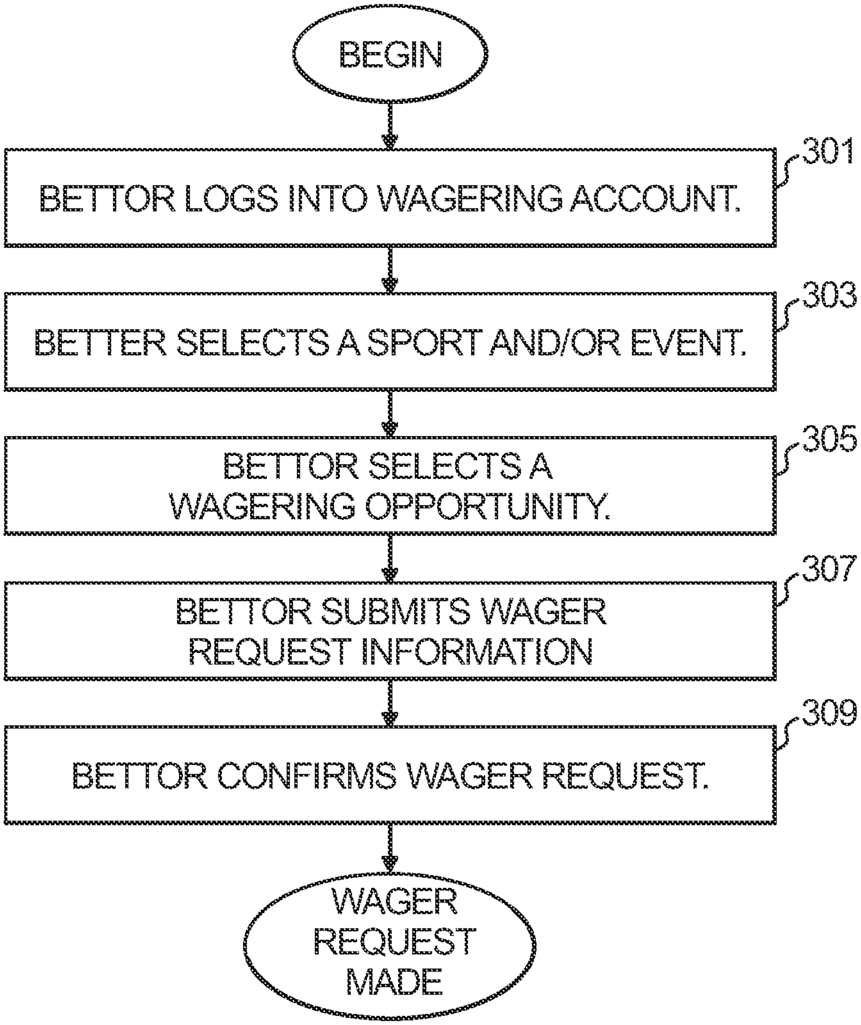
FIG. 3 illustrates an example method of submitting a wager request that may be performed in some embodiments.

FIG. 3 illustrates an example method that may be performed to submit a wager request. Such a method may be performed by a bettor, for example, to submit a wager request to a gaming operator. A gaming operator may perform an enabling and/or facilitating method (e.g., allowing login, presenting interfaces, offering wagering opportunities, receiving wager requests, receiving confirmations, and so on). Such a method may include a bettor logging into a wagering account (e.g., 301). Such a method may include a bettor selecting a sport and/or other event through an interface (e.g., 303). Such a method may include a bettor selecting a wagering opportunity related to the sport and/or event (e.g., 305). Such a method may include a bettor submitting wager request information related to the wagering opportunity during an offering of the wagering opportunity (e.g., 307). Such a method may include a bettor confirming the wager request through an interface (e.g., 309). In some embodiments, such actions performed by a bettor (e.g., in connection with a gaming operator) may result in a wager request being made with the gaming operator from the bettor. It should be recognized that such a method is given as an example only and that other embodiments may include similar, different, no, more, fewer, alternative, differently ordered, and so on methods and/or actions.

Some embodiments may include a bettor signing into a wagering system and/or account (e.g., 301). Such signing may include verifying an identity with a username and/or password. Such signing in may include starting an application on a mobile device associated with the account.

Some embodiments may include providing a wagering interface to a bettor through which the bettor may select one or more event types and/or events. FIG. 4 illustrates an example interface. For example, a user may select control 401 to choose to view wagering opportunities related to a Vikings vs Saints game.

In some embodiments, in response to such a selection, a user may be provided with an indication of wagering events related to such a selection. FIG. 5 illustrates an example interface displaying wagering opportunities related to one or more selected events. For example, the example interface shows an example of a presented list of wagering opportunities related to two selected games (e.g., Saints vs Cardinals and Patriots vs Raiders).

In some embodiments, a bettor may select an offered wagering opportunity with which to interact (e.g., 305). Such a selection may be made through an interface of a device such as one illustrated in FIG. 5. Such a selection may include selection of an outcome on which to wager and/or a selection of the event at large. In some embodiments such an interface may allow selection of currently offered wagering opportunities to submit wager request for such opportunities. In some embodiments, such an interface may prevent selection of not-currently offered wagering opportunities (e.g., prior and/or future opportunities). In some embodiments, such an interface may allow selection of future wagering opportunities so that a bettor may queue a wager request. Such a queued wager request may be submitted when the wagering opportunity is offered in the future, may be transmitted earlier, and queued on a server side, and so on.

Figure 6:
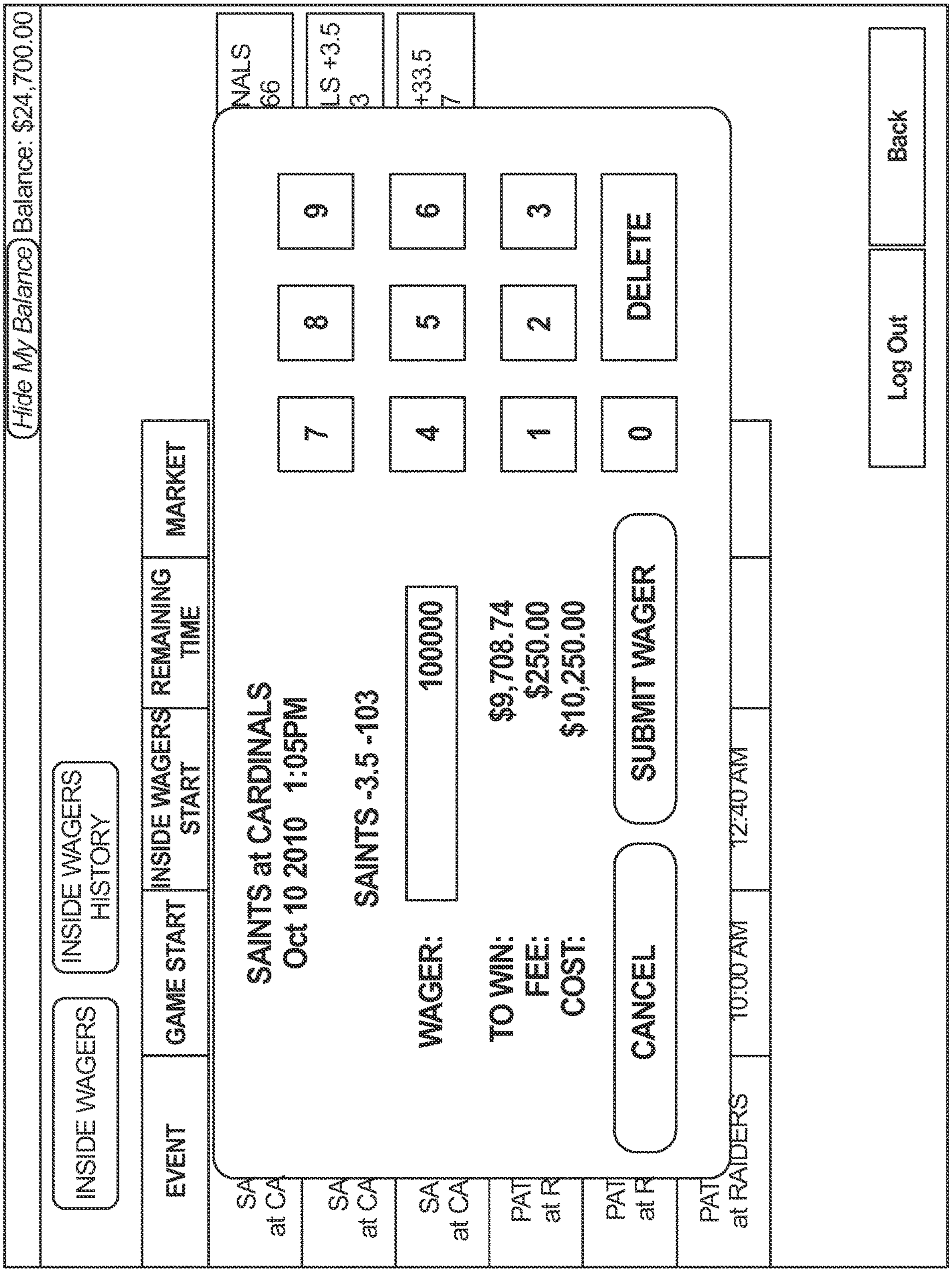
FIG. 6 illustrates an example interface that may be used in some embodiments.

In some embodiments, in response to a selection of a wagering opportunity, an interface through which a bettor may submit information defining a wager request may be presented. FIG. 6 illustrates such an example interface. Such an interface may be related to a particular outcome and/or an event at large and allow the selection of an outcome. Through such an interface, a bettor may submit information defining the wager request (e.g., 307). For example, the bettor may choose a wagering opportunity for which the request may be submitted, may establish an amount of money associated with the request, may operate one or more controls to initiate a request, and so on. In some embodiments, a request may be transmitted from a computing device operated by a bettor to a computing device associated with an offered wagering opportunity in response to a bettor entering one or more inputs.

In some embodiments, a wager request may be received from a bettor. In some embodiments, such wager requests may be received from bettors and/or devices operated by bettors through one or more communication networks. Such bettors may enter information about such request through one or more interfaces, devices, kiosks, and/or other desired manners and/or apparatus. In response to such information being entered and/or one or more controls being actuated, a request may be transmitted through one or more communication networks such as the Internet, a cellular telephone network, a Wi-Fi network, and so on to one or more computing devices, services, gaming operators, and/or desired entity.

In some embodiments, a person at a wagering venue such as an employee at a sports book “window” may be given information such as a wagering slip or oral communication with information about a wager request, by a bettor. Submitting such information to such a person may be considered submission of a wager request in some embodiments. Such person may enter such information into a computer system that may be associated with one or more acts of accepting and/or processing such wager requests.

In some embodiments, a wager request may be considered made when information about the request is received, sent, processed, confirmed, and so on. It should be recognized that any manner of making a request may be used in various embodiments whether through networks and/or device, in person, and/or using other methods and/or apparatus.

Figure 7:
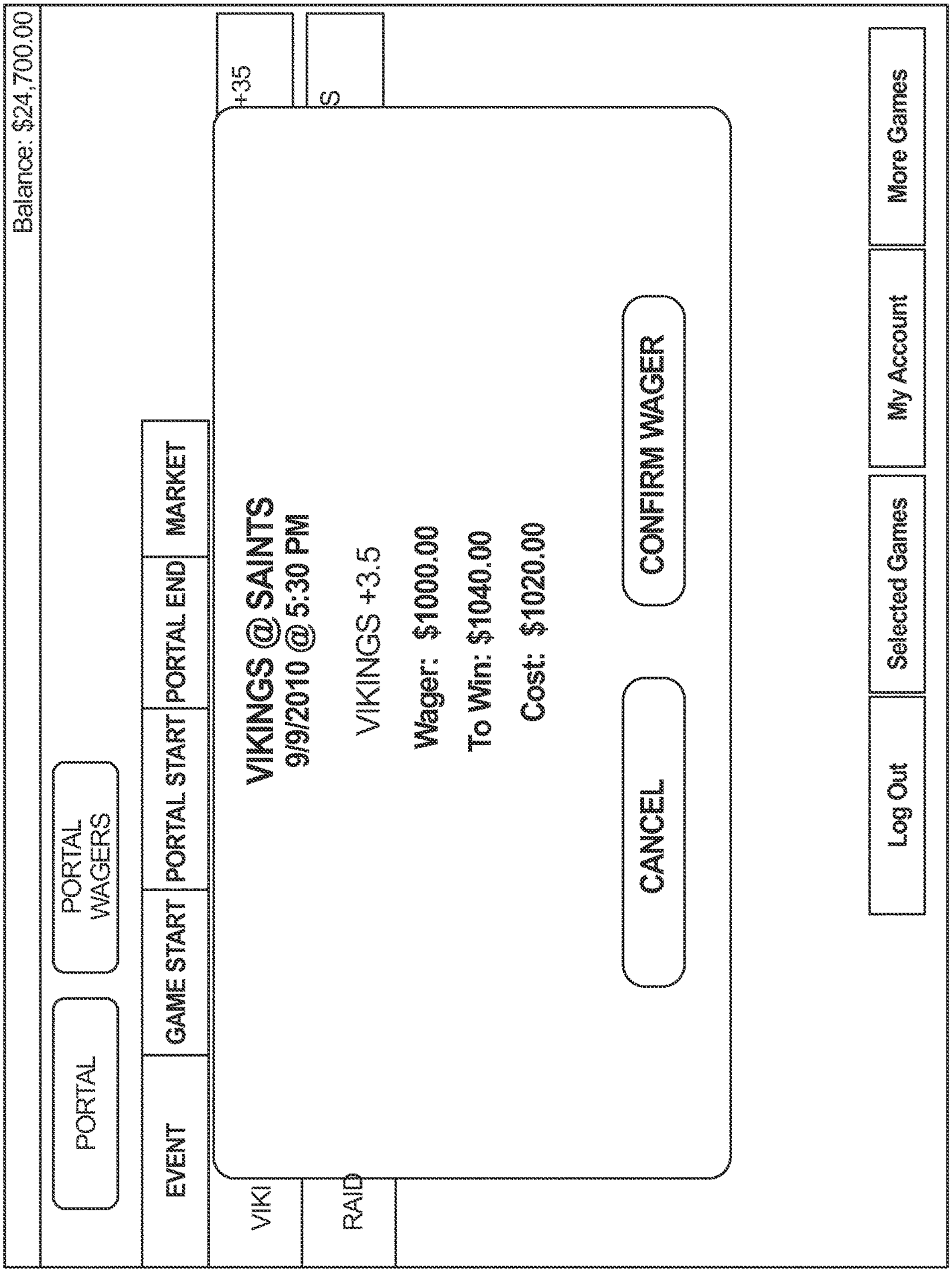
FIG. 7 illustrates an example interface that may be used in some embodiments.
Figure 8:
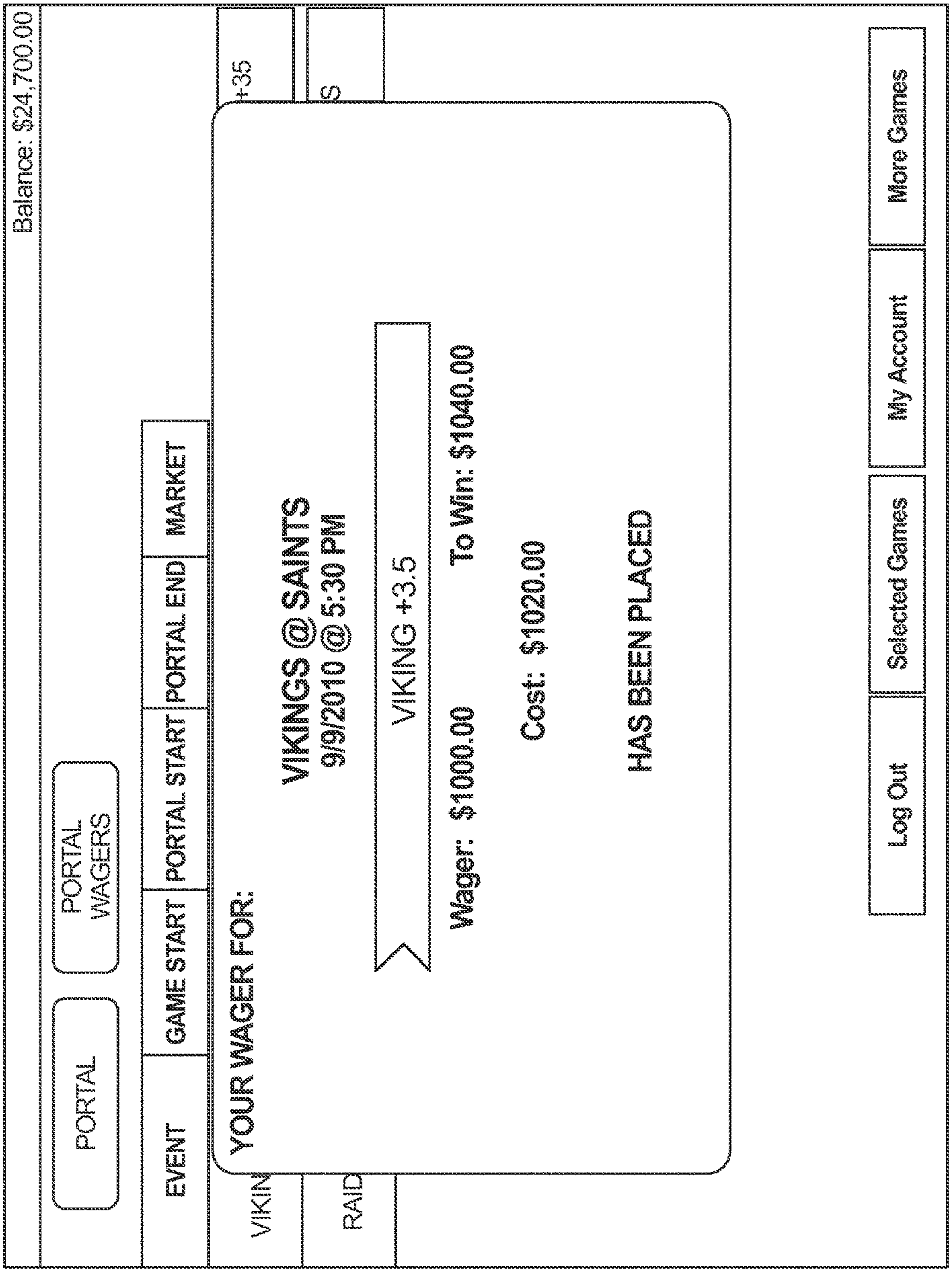
FIG. 8 illustrates an example interface that may be used in some embodiments.

Some embodiments may include confirming a wager request with a bettor. Such confirmation may be required before a wager request may be made in some embodiments. FIG. 7 shows an example interface that may be used to confirm a wager request. A bettor may use such an interface and/or any other interface and/or method to confirm a wager request (e.g., 309). In some embodiments, in response to a wager request being confirmed, a wager request may be made. In some embodiments, in response to a wager request being confirmed, a confirmation may be presented to the bettor. FIG. 8 illustrates an example of such a confirmation.

In some embodiments, a wager request may include an indication that a bettor desires to enter into a wager associated with an offered wagering opportunity. The indication may include an identifier that may be used to determine an event, a game, a wagering opportunity, and so on which a bettor desires to place a wager. The indication may include an amount of money that a bettor desires to wager. The indication may include information identifying a bettor, a bettor's account, a device used by a bettor to place a wager, and/or any information that may be used to determine an originator of a wager request. The indication may include any number of characteristics that may define a desired wager and/or from which a desired wager may be determined.

A wager request may include an indication of an associated wagering opportunity. For example, in some embodiments a numerical indicator, such as an ID code, may identify a wagering opportunity. In such embodiments, a wagering ID may be assigned to each wagering opportunity and transmitted to a bettor (e.g., through an interface, network, and/or other device). Such a device may be used to transmit a wager request and may include the received wagering ID in an electronic message that identifies the request. Such an ID may be used by a computing device that receives the request to determine which wagering opportunity the request is associated with (e.g., if there are multiple opportunities being offered). A request may include an electronic message that has within it such an ID.

In some embodiments, characteristics of a wagering opportunity may be used to identify the wagering opportunity for which a request is made (e.g., an odds, a spread, a start time, an end time, an event, an outcome, and so on). In some embodiment, any desired information may be included in a request for a wager that may be used to determine which wagering opportunity to associate with the wager request.

In some embodiments a single wagering opportunity may be offered at a time, through a particular device, at a particular venue, and/or in any other manner such that a receipt of a wager request at a particular time may be associated with a single wagering opportunity based on a time of receipt, a location of receipt, a location of origin, a time of transmission, and so on. In some embodiments, all such requests may be interpreted to be for a single opportunity associated with a device, location, and/or time. In some embodiments no such ID may be used when a single wagering opportunity is offered at a time because a wagering opportunity may be derived based on a time a wagering request is made.

In some embodiments, one or more wager requests may be received for wagers on one or more respective outcomes of one or more respective events. For example, in some embodiments, a wagering opportunity may be associated with wagers that the Bears will win an upcoming game against the Packers by 3.5 or more points for a price of +105 and that the Packers will win the same game or lose the game by 3.5 or fewer points at a price of −105. Respective wager requests for both of the possible outcomes at the associated prices may be received during a time period that the wagering opportunity is offered. In some embodiments, in response to a making of a wager request during an offering, such a wager request may be further processed as desired and/or described elsewhere herein.

In some embodiments, wager requests may be restricted from being made before and/or after an offering of a wagering opportunity. For example, processing, transmission and/or receipt may be allowed only during an offering of a wagering opportunity. For example, before and/or after an offering, a control (e.g., a button) that may be associated with submission of a wager request may be grayed out or otherwise disabled in a device and/or interface that a bettor may use to submit wager requests. In some embodiments, wager requests received before and/or after a wagering opportunity may be ignored.

In some embodiments, a wager request may be made before and/or after an offering of wagering opportunity associated with the request. For example, in some embodiments, a request received before and/or after an offering may be queued (e.g., if a request is received for a future opportunity, it may be queued until that opportunity is offered, if it is received for a past opportunity, it may be queued until a same or similar opportunity is offered in the future). In some embodiments, a relevant time may be not when a request is received, but rather a time when a bet is transmitted, and/or some other time that may be relative to one or more of a receipt time and/or transmission time, and/or other time (e.g., time when a user presses a control). For example, in some embodiments, wager requests that were transmitted before an end of an offering but received after an end of an offering may be considered made during an offering, in some embodiments, but not in other embodiments.

In some embodiments, before a wager request may be made, a user may be required to sign up for a service, open an account, obtain an application to run on a computing device, register with a gaming operator, provide a proof of age, place an amount of money at least as large as a wager on deposit, and so on. Signing up for such a service may include opening an account that money for wagers may be taken out of and/or deposited into, make any desired identification (e.g., age, name, Social Security number, location, mobile phone number, Mac address of computer, and so on).

In some embodiments, any desired device may be used to place wager requests and/or obtain information about wagering opportunities. For example, mobile devices, stationary devices, kiosks, interfaces, computing devices, touch pads, motion detecting devices, and so on may be used. Various restrictions may be placed on such device, such as location restrictions, use restrictions, software restrictions, and so on. Users may be required to sign into an account using a password and/or may be occasionally required to verify their identity in order to make wager requests.

In some embodiments, a bettor may be required to have an amount of money at least as great as the amount wagered in an account in order to make a wager request, actuate a submission control, and so on. In some embodiments such amount may be withdrawn from an account in response to a request being made. In some embodiments, if a wager request is rejected as described elsewhere herein, such an amount may be returned. In some embodiments such an amount may be removed from an account and/or required to be deposited in an account in response to a wager being accepted by a gaming operator to form a wager rather than in response to a wager request being submitted. In some embodiments, such an amount of money may be removed from an account and/or required to be deposited into an account in response to a wager formed between a bettor and a gaming operator being lost.

In some embodiments, a wager request may include a binding request upon the bettor submitting the request (i.e., if the gaming operator accepts the request, a binding wager may be formed between the gaming operator and the bettor). In some embodiments, such a request may be cancelled (e.g., before an end of an offering, before such a request is accepted by a gaming operator to form a wager, in accordance with desired restrictions). In some embodiments such a request may not be cancelled and/or modified by a bettor and/or a gaming operator. In some embodiments such a request may be modified (e.g., before an end of a wagering offering, before such a request is accepted by a gaming operator to form a wager, in accordance with desired restrictions) by a bettor and/or gaming operator. Modification and/or cancellation of such a wager request may be performed, for example, by a bettor through a computing device, interface, gaming operator employee, and so on, such as by submitting information requesting a modification. Modification and/or cancellation of such a wager may be performed by a gaming operator such as by a computer system modifying and/or cancelling a wager request that has been received, requesting that a bettor accept such a modification and/or cancellation, a gaming operator employee making a modification and/or cancellation, in response to a request for such a modification and/or cancellation (e.g., from a bettor), and so on.

XV. Determining Wager Requests for Acceptance

Some embodiments may include accepting one or more wager requests and/or determining one or more portions of one or more wager requests to accept. Element 107 of FIG. 1 illustrates an example of such determining. Acceptance of a wager request may include forming a wager based on the wager request between a gaming operator and a bettor associated with the wager request. Determining one or more portions of one or more wager requests to accept may include determining according to a business rule, determining according to a risk tolerance, determining in order to balance a risk, determining based on one or more other wager requests, other wager requests (e.g., other wager request for a same event), determining based on previously wagering opportunities, and so on.

In some embodiments, such accepting and/or determining may be performed by a gaming operator, a computing device, an employee, a server, and so on. Such determining and/or accepting may be performed at any time (e.g., during an offering, after an offering, and so on). In some embodiments, such determining and/or accepting may be performed after an offering of the wagering opportunity associated with the one or more portions of one or more wager requests and/or at an end of an offering.

In some embodiments, such acceptance and/or determining may be based on a risk associated with acceptance of one or more wager requests. A gaming operator that may accept a wager request may take on risk by accepting such a wager request. For example, the gaming operator may take on a risk that a wager formed by accepting a wager request may include a winning wager by the bettor associated with the wager request. The gaming operator may be required to pay an amount of money to the bettor in such a scenario and may accordingly be at risk for possibly having to pay the bettor that amount of money when such a wager request is accepted. In some embodiments, a regulatory authority may require such a gaming operator to have an amount of money on reserve based on such amount of risk (e.g., an amount equal to an amount at risk, a percentage of such an amount). In some embodiments, a gaming operator may desire to minimize an amount of risk.

In some embodiments, one wager (e.g., a wager formed by accepting a wager request on one side of a wagering opportunity) may offset an amount of risk to another wager (e.g., a wager formed by accepting a wager request on another side of a wagering opportunity). Such an offset may be based on an amount of risk associated with the other wager, an amount of money wagered in the other wager, a chance of the other wagering including a winning wager when the wager is also a winning wager, a similarity between the wager and the other wager, and so on.

For example, a first wager that the Bears will win an upcoming game against the Packers by 3.5 or more points that may result in a gaming operator paying $10,000 to a bettor may have a $10,000 risk associated therewith. A second wager that the Packers will win the upcoming game against the Bears or lose the game by less than 3.5 points that may result in the gaming operator paying $10,000 to a bettor may have a $10,000 risk associated therewith. In some embodiments, the gaming operator may take in a deposit of $10,000 for accepting both wagers. Although the first and second wagers may each have a respective $10,000 risk for the gaming operator, the combination of the two wagers may have a $0 risk because the game may have two possible outcomes, so the risks for each outcome may cancel each other.

One further example of such risk offsetting may include another Bears vs Packers game. Such a game may be associated with a −105 wager that the Bears will win the game by 3.5 or more points and a +105 wager that the Packers will win the game or the lose the game by less than 3.5 points. In some embodiments, a first bettor may make a $100 dollar first wager request on the Packers side of the wagering opportunity. If the gaming operator accepts such a first wager request, the gaming operator may receive $100 and may be at risk of having to pay the first bettor $105 plus the original $100 for a total of $205 dollars of risk. An offsetting amount of risk may be associated with a second wager request from a second bettor. Such a second wager may include a $105 wager on the Bears side of the wagering opportunity. If the gaming operator accepts such a second wager request, the gaming operator may receive $105 and may be at risk of having to pay the second bettor $100 plus the original $105 for a total of $205 dollars of risk.

The total amount that the gaming operator may be at risk for in such an example may be $205 because both outcomes of the wagering opportunity cannot happen. Also, the gaming operator may have taken a total of $205 on deposit from the two wagers so that the gaming operator may have a total of $0 in additional unfunded risk from such example two wagers combined.

It should be recognized that although examples of risk and offsetting wagers are given in terms of a single team in a single game having a points spread and a money line wager, that other embodiments may include even odds, tournaments, parlays, individual players, no spreads, and/or any desired wager type that may be associated with a risk amount that may be offset with any other desired wager of a same and/or different type.

In some embodiments two wagers may have offsetting risk even if the outcomes are not binary outcomes. For example, in some embodiments, a pair of wagers may have offsetting risk if it is impossible for both outcomes to occur at one time. This may be true even if it is possible for neither outcome to occur. For example, a wager that the Bears may win a game by 3.5 or more points may have a risk that may offset a risk associated with a wager that the Packers may win the game by 1 or more points. Such wagers may have offsetting risk because the two outcomes may not both occur (i.e., both the Bears and the Packers cannot win the game) even though it is possible that neither outcome will occur (e.g., the Bears win by only 1 point). It should be recognized that in some embodiments, one wager's risk may offset another wager's risk if an outcome of one wager may not occur if the outcome of the other wager does occur.

In some embodiments, one wager's risk may offset another wager's risk even if both outcomes may occur at the same time (e.g., are mutually exclusive). For example, a first wager that the Bears will win a game by 3.5 or more points may have an offsetting risk of a second wager that the Packers will win the game or lose the game by less than 4.5 points. This may be the case even though both outcomes may occur at the same time (e.g., the Bears win by 4 points). In some embodiments such an offsetting risk may not be 100%. For example, an amount of such an offset may be based on a chance that both events could occur at the same time (e.g., a chance that the Bears win by points). Such a chance may be determined based on an expectation of events occurring such that both events occur. For example, in some embodiments, f there is a 10% chance of the Bears winning by 4 points, a wager on the Bears side may offset risk of a wager on a Packers side by 90%.

Figure 9:
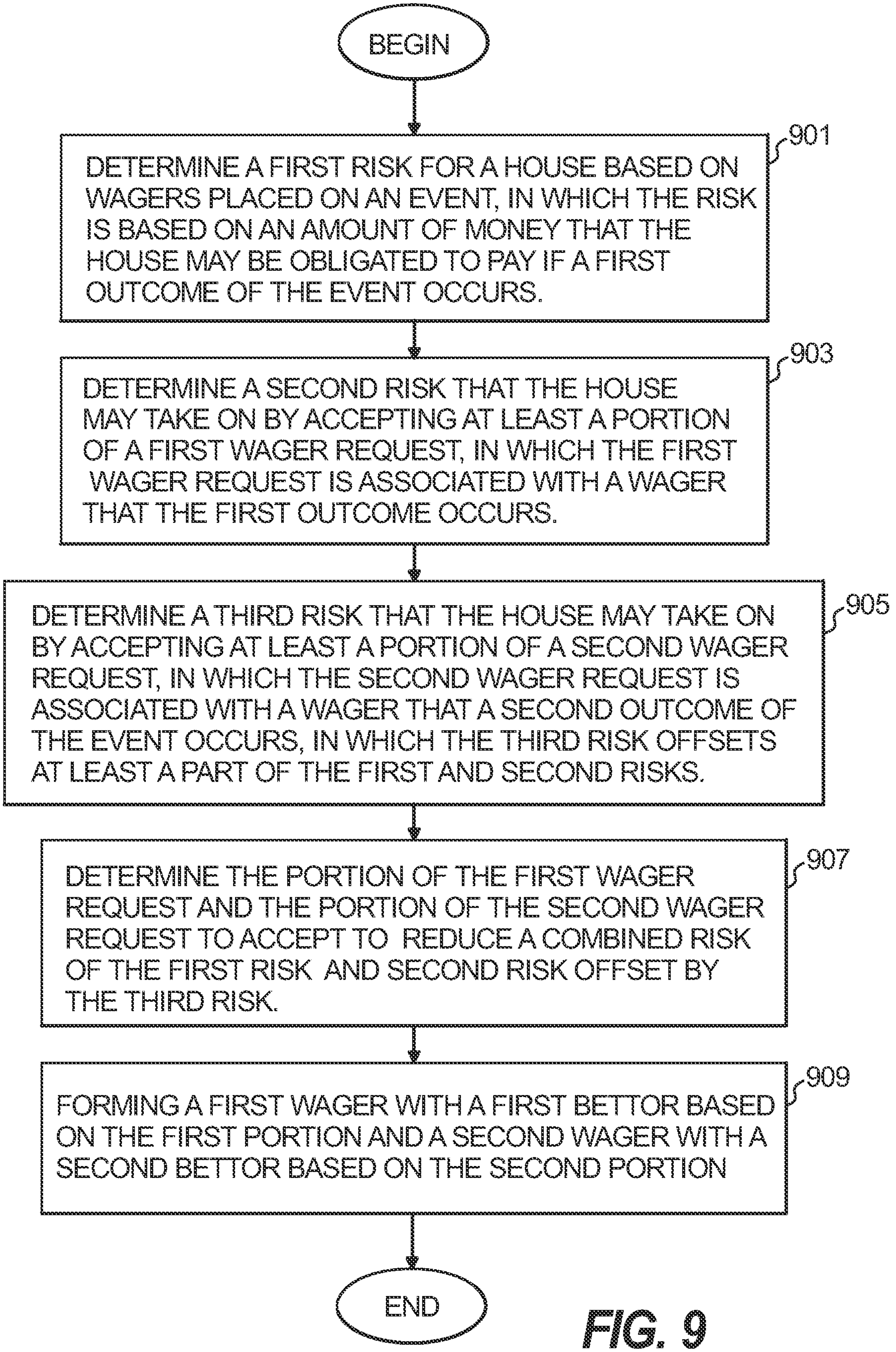
FIG. 9 illustrates an example method of accepting wager requests that may be performed in some embodiments.

FIG. 9 illustrates an example method of determining one or more wager requests and/or portions of wager requests to accept. Such a method may be performed by a bettor, for example, to submit a wager request to a gaming operator. Some embodiments may include determining a first risk for a gaming operator based on wagers placed on an event, in which the risk is based on an amount of money that the gaming operator may be obligated to pay if a first outcome of the event occurs (e.g., 901). Some embodiments may include determining a second risk that the gaming operator may take on by accepting at least a portion of a first wager request, in which the first wager request is associated with a wager that the first outcome occurs (e.g., 903). Some embodiments may include determining a third risk that the gaming operator may take on by accepting at least a portion of a second wager request, in which the second wager request is associated with a wager that a second outcome of the event occurs, in which the third risk offsets at least a part of the first and second risks (e.g., 905). Some embodiments may include determining the portion of the first wager request and the portion of the second wager request to accept to reduce a combined risk of the first risk and second risk offset by the third risk (e.g., 907). Some embodiments may include forming a first wager with a first bettor based on the first portion and a second wager with a second bettor based on the second portion (e.g., 909). It should be recognized that such a method is given as an example only and that other embodiments may include similar, different, no, more, fewer, alternative, differently ordered, and so on methods and/or actions.

Some embodiments may include determining an amount of risk that may add to a risk of a gaming operator by accepting a first wager request (e.g., 903). Various examples of determinations of an amount of risk associated with accepting a wager request are described elsewhere herein.

Some embodiments may include determining a second amount of risk that may offset the first amount of risk by accepting a second wager request (e.g., 905). Various examples of determinations of an amount of an offset of risk between two wagers are described elsewhere herein. In some embodiments, an offered wagering opportunity may include wagers that offset each other's risks.

Some embodiments may determine the wager requests to accept such that the total amount of risk for accepting a group of wager requests is minimized, is less than a threshold amount, is offset by at least a percentage, is reduced, and so on (e.g., 907). Such determination may occur during an offering of a wagering opportunity such as when wager requests that offset each other's risk are received, at the end of an offering and/or after an offering such as when all wager request for an opportunity have been made. In some embodiments, such a determination may be made in a neutral and/or non-discriminatory manner (e.g., FIFO, LIFO, pro-rata, all, none, and so on). In a FIFO embodiment, wager requests may be accepted based on a first in first out method such that wager requests that are made on a particular side of a wagering opportunity are accepted before other wager requests on that side of the wagering opportunity. Such a determination may be made such that a risk of one wager is at least in part offset by the risk of one or more other wagers that may be associated with a same and/or similar wagering opportunity. Such a determination may be made such that a combined risk is minimized, such that a combined risk is reduced compared to an individual risk, such that a combined risk has a desired characteristic, and so on.

In some embodiments, a gaming operator may operate such that it does not have a disproportionate interest and/or risk in one team over the other in a particular game. For example, in an example of a Bears and Packers game (−105 Bears/+105 Packers), a gaming operator may receive a first wager request to place a first wager on the Bears side of $5,250. A gaming operator may receive a second wager request to place a second wager on the Packers side of $4,000, and a third wager request to place a third wager on the Packers side of $3,000. Accordingly, there may be a total amount of risk on the Bears side of $10,250 (e.g., $5,250 original plus $5,000 if the Bears win). And a total amount of risk on a Packers side of 14,350 (e.g., $7,000 original plus $7,350 of the Packers win). A house (e.g., a computing device, a gaming operator, an employee) may determine that the entire $10,250 of risk for the Bears side should be accepted and that an offsetting $10,250 of risk for the Packers side should be accepted. This may be accomplished, for example, by accepting the entire second wager request and a portion of the third wager request. The third wager request may only have a portion accepted because it was received later than the second wager request in a FIFO embodiment. In other embodiments, the entire third wager request may be accepted and a portion of the second wager request may be accepted, and/or a portion of each of the second and third wager requests may be accepted.

In some embodiments, a gaming operator may determine that wager requests should be accepted such that a risk is not completely offset. For example, a business rule may be used to determine such an amount. As another example, wager requests should be accepted such that a full wager request that brings an amount of risk as low as possible should be accepted (e.g., in embodiments in which wager requests may not be modified by a gaming operator).

As an example, a gaming operator may determine that a static percentage, a static amount, a varying amount, and so on of "excess" risk on one side of a wagering opportunity should be accepted. For example, a gaming operator may choose to accept wager requests on each side to the extent that its risks are offset to within (i) a fixed percentage such as 10% (e.g., accept $1,000 of additional risk on the Packers side in the about example, (ii) a certain dollar amount (e.g. accept no more than $10,000 of "excess" risk), or (iii) some combination of percentage and dollar amount factors. The betting portal may accept different levels of excess risk and apply different factors in different wagering opportunities. In some embodiments, one or more rules may be applied and/or modified to determine which if any wager requests to accept. For example, in some embodiments, an unaccepted amount of wagers may include wagers that would be unaccepted based on a strict balancing method of risk, and a gaming operator may determine to accept an amount of such unaccepted wagers equal to a greater and/or lesser of an amount of the unaccepted amount that is equal to a percentage (x) of the unaccepted amount, and a dollar amount (z). Such a percentage and/or dollar amount may be configurable.

Although some examples of determining wager requests to accept and/or risk offsetting have been described with reference to wager requests and/or wagers offered in a single wagering opportunity, it should be recognized that risk may affect later and/or earlier wagering opportunities. For example, an excess risk from accepting wager requests in prior wagering opportunity may be used to determine wager requests to accept in a later wagering opportunity (e.g., 901). A gaming operator may attempt to offset the excess risk from the prior wagering opportunity by accepting wagering in the later wagering opportunity. For example, if a prior wagering opportunity resulted in an excess risk of $1,000 on a Packers side of a game with a 3.5 point spread for the Bears and a +105 price, a gaming operator may attempt to offset such risk in determining a wager requests to accept related to a wagering opportunity on the same Bears and Packers game. Such an opportunity may include a same and/or different odds and/or price. For example, the gaming operator may determine that an additional $1,000 of risk on the Bears side should be accepted (e.g., if the Bears side of the later opportunity offsets the Packers side of the prior opportunity), and/or some other amount that may be based on how offsetting the two opportunities may be to one another. In some embodiments, determining wager request to accept for a wagering opportunity may include balancing a risk amount from prior wagering opportunities and/or wagers along with balancing risks associated with received wager requests for the wagering opportunity (e.g., 907).

In some embodiments, a gaming operator may require a minimum volume of money to be wagered, a minimum number of wager requests, and/or a minimum number of wager requests per team/outcome for a wagering opportunity in order to accept any of the wager request entered by bettors for a particular wagering opportunity. For example, the gaming operator may only accept wager requests for a particular wagering opportunity if it can accept at least a portion of at least two wagers on each side of a wagering opportunity (e.g., can accept two wagers backing the Bears and can accept two wagers backing the Packers). If the minimum requirement(s) cannot be reached, the gaming operator may reject all wager requests for a particular wagering opportunity.

Some embodiments may accept wager requests and/or portions of wager requests in accordance with a determination made to offset risk. Such acceptance may include forming wagers between the gaming operator and the bettors associated with the wager requests that are accepted (e.g., 909). Some embodiments may include accepting portions of wager requests. Such accepting of portions may include forming wagers between the gaming operator and the bettor for less than a full requested wager amount. Some embodiments may include notifying a bettor that a wager request and/or portion of a wager request has been accepted. Some embodiments may allow a bettor to cancel a wager request upon such a notification (e.g. with a time period). Some embodiments may include verification before forming a wager. Some embodiments may automatically form a wager without a bettor input.

In some embodiments, a gaming operator may determine an amount of money needed to meet a reserve requirement based on risk associated with accepted wager requests. Such an amount of money may include an amount of risk associated with a combined set of wager requests accepted in one or more wager offerings. Some embodiments may include placing such an amount of money in reserve.

Some embodiments may include determining an outcome of a wager formed by an acceptance of a wager request. Resolving wagers may be performed in some embodiments such as in a manner that may be known in the art. For example, such wagers may be resolved in a manner similar to resolving sports book wagers. For example, in response to determining that the Bears win a Bears vs Packers game by 4 points, a wager that the Bears will win the game by 3.5 or more points may be determined to be a winning wager. A bettor associated with such a winning wager may be paid an amount of money determined by a price of the wager and an amount of money placed on the wager. Such money may be added to a bettors account.

It should be recognized that although various examples are given with respect to determining a single portion and/or a single wager request for acceptance that any number of wager requests and/or portions of wager requests in any combination may be determined to be accepted as desired (e.g., based on risk associated with such acceptances).

XV. Other Embodiments

Figure 10:
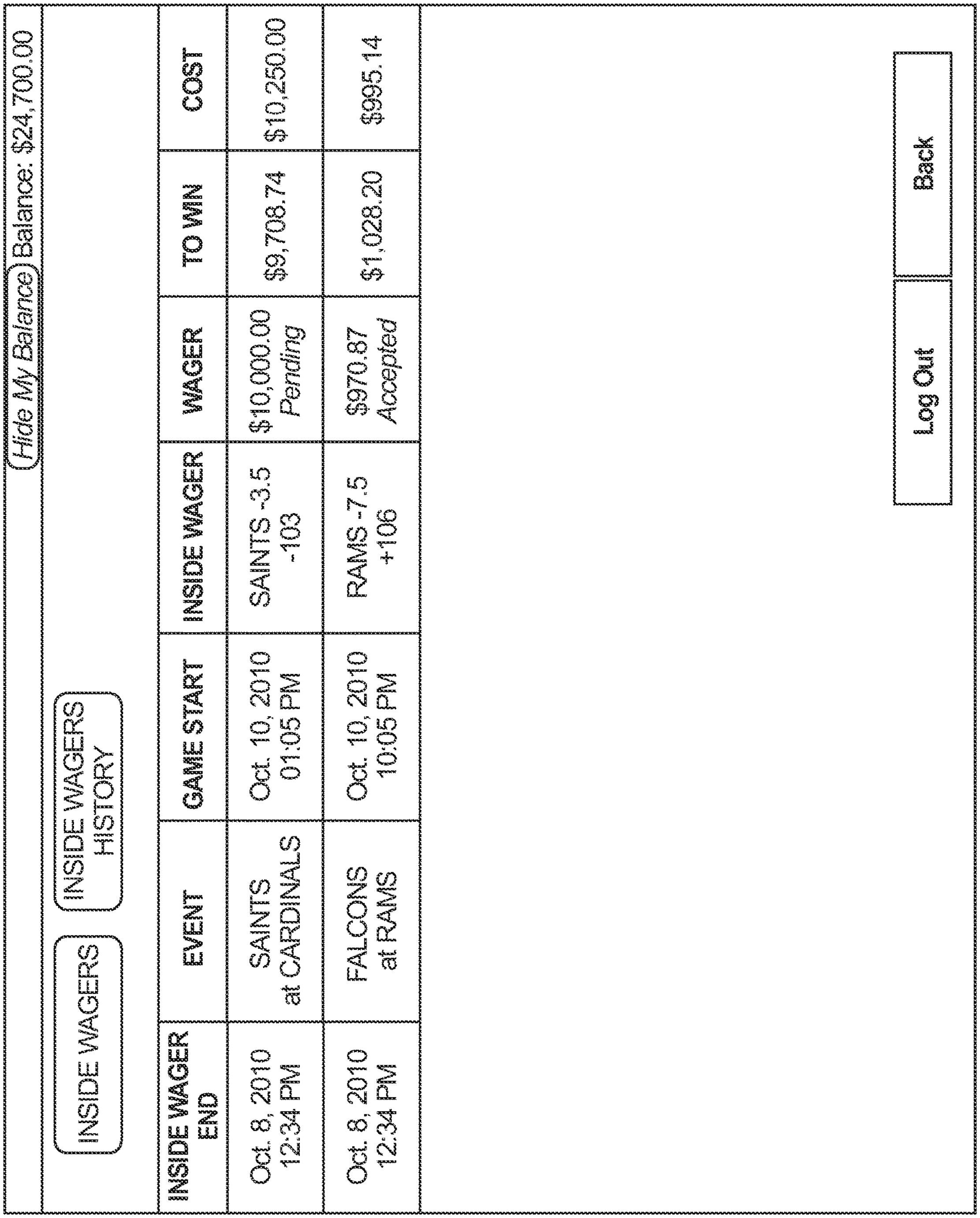
FIG. 10 illustrates an example interface that may be used in some embodiments.

Some embodiments may allow a bettor to view a history of past wagering activity. Such activity may include wager requests that have been made, wager requests that have been accepted, outcomes of formed wagers, account transactions, account balances, and so on. Such information may be accessible through a device interface. FIG. 10 illustrates an example interface that may be used to display wagering history.

Some embodiments may accept wager requests from one or more sports books. Such a sports book may act as a bettor as described above. In some embodiments, sports book betting may include additional, fewer, and/or alternative requirements and/or methods. For example, a sports book may not be required to prove age in order to make a wager request, may not be required to open a wagering account, and so on.

a. Commissions

Some embodiments may include charging one or more bettors a commission. For example, some embodiments may include charging all bettors a commission, charging winning bettors a commission, charging losing bettors a commission, and so on. Such a commission may include a flat fee, a percentage fee, and so on. For example, a commission may include 2 cents, 2% of a wagered amount, 2% of a won amount, and so on.

In some embodiments, a commission may be different for different sides of an event (e.g., a different commission may be charged to bettors on the Bears in a Bears vs Packers game than for bettors on the Packers in the same game). In some embodiments, a size of a commission may be based, at least in part, on an amount won by the wager and/or an amount wagered. For example, a higher magnitude negative odds (e.g., −200 in a money line) may have a lower commission than a higher magnitude positive odds (e.g., +200 in a money line), a lower magnitude negative odds, and/or a lower magnitude positive odds.

Some embodiments may include determining and/or charging a commission based on odds of a wager. For example, in some embodiments, if a first amount that must be wagered for a chance to win a second amount is substantially larger than the second amount, then a commission may be lowered (e.g., a lower dollar amount, a lower percentage). In some embodiments, if a third amount that must be wagered for a change to win a fourth amount is substantially smaller than the fourth amount, then a commission may be raised (e.g., a higher dollar amount, a higher percentage).

Some embodiments may include determining a size of a commission (e.g., a percentage, an amount and so on) based on a relationship between and/or a value of an amount wagered, an amount that may be won, an amount that is won, and so on. For example, if an amount that must be wagered to win $100 is above a threshold value (e.g., $200), then a commission may be waved. In a money line wager, such an example wager may include a wager having odds of −200. For example, if an amount that must be wagered to win $200 is below a threshold value (e.g., $100), then a commission may be doubled. In a money line wager, such an example wager may include a wager having odds of +200.

In some embodiments, percentage of a commission and/or a dollar value of a commission may include a sliding scale and/or step scale between a full commission, a double commission, a waived commission, and so on (e.g., at −200 no commission may be charge, at −120 a full commission may be charged, between −120 and −200 some commission may be charged based on the particular odds). As another example, in some embodiments, if a bettor must bet 8 or more dollars for a chance to win 1 dollar, the commission may be waived. Such a system may charge a greater commission to players that wager on an underdog and a lower commission to those that wager on a favorite. In some embodiments, commission reduced on one side may be added to another side, but in other embodiments such addition may not take place.

It should be recognized that examples of determining commissions and/or commissions themselves are given as non-limiting only and that any method of determining a commission based on odds of a wager may be used as desired. Such determination may be made, for example, by a computing device operated by a gaming operator. In some embodiments, any desired input may be used as a basis for a determination of a commission. For example, a commission may be based on a spread (e.g., a large spread may have a reduced commission, a small spread may have an increased commission, a small spread may have a reduced commission, a large spread may have an increased commission), a commission may be based on a time of an event and/or wagering opportunity offering (e.g., a lower commission for times that are less busy, a larger commission for times that are more busy, a lower commission for times that are more busy, a larger commission for times that are less busy), and/or any characteristic that may define a wagering opportunity and/or wager request.

b. Control Interfacing

Some embodiments may include facilitating an operating interface and/or API. Such an interface and/or API may allow a gaming operator to establish new wagering opportunities, modify existing wagering opportunities, override automated decisions, and so on. Through such an interface, a user and/or device may submit information about a desired and/or offered wagering opportunity offer, close, and/or otherwise control the wagering opportunity. In some embodiments, such an interface may accept an electronic message that may include a command, and/or one or more parameters. Such a message may include an XML message and/or any desired message format that may be understood by a device receiving the message. Such a message may be sent in response to an operator entering information in a user interface instructing the message to be sent. For example, an operator may control when a wagering opportunity is offered and/or closed by entering such information in a user interface. The device being accessed by the operator may interpret the entered information, generate or/and transmit an electronic message in a format that may be understood by a receiving device to instruct the receiving device to offer, modify, and/or close a wagering opportunity having the desired parameters. It should be recognized that such an interface may allow any desired wagering opportunity to be created, managed, and so on through a remote user interface by one or more operators, auditors, regulators, and/or customers as desired. In some embodiments, similar functionality may be provided for control of acceptance of wager requests (e.g., an operator may adjust parameters that control an automated wager request acceptance, an operator may manually accept a wager request, and so on).

c. Data Collection, Sale, and/or Usage

Some embodiments may include determining data regarding one or more wagers and/or wager requests. Such data may be recorded, sold, processed, modified, and so on as desired such as by a computing device of a gaming operator. Such data may include, for example, a number of wagers, an amount wagered, a number of people wagering, a number of wager requests, an amount of money requested to be wagered, request for wagering opportunities, an amount of unaccepted money associated with wager requests, a number of people requesting that a particular wagering opportunity be offered, and so on. Further examples of such data may include information about wagers and/or wager requests that may not have been placed or otherwise submitted. For example, in some embodiments, such information may include wager requests that were submitted after a wagering opportunity was closed (e.g., a bettor submitted the wager request too late), before a wagering opportunity was offered (e.g., a bettor submitted a wager request too early), not submitted but entered (e.g., a user changed his or her mind after entering information about a wager request into an interface and the interface transmits such information for use as data). Such data may be collected by a computing device, a person, and so on.

In some embodiments, for example, if a gaming operator receives more requests for a Bears side of a Bears vs Packers wagering opportunity than the gaming operator determines should be accepted (e.g., based on a risk analysis), the gaming operator may reject at least a portion of one or more wager requests on the Bears. Data regarding the rejected requests may indicate that at the particular odds and/or spread, that more money is available for the Bears than the Packers. Such information may be useful in establishing odds, offering wagers, and so on.

For example, odds may be adjusted to balance an amount of money at risk on both sides in such an embodiment by adjusting odds of a next wagering opportunity so that the Bears are less favored in response to determining that at a first set of odds more money is put at risk on the Bears. Such an imbalance in risk may be indicative of a miscalculation of odds if the desire of calculating odds is to match the perceived proper odds of the wagering population. Accordingly, an imbalance in risk associated with an offered wagering opportunity may be used to adjust any desired future wagering opportunity odds, spread, and/or other characteristic. It should be recognized that such data may include data from any number of wagering opportunities over any period of time. In some embodiments, data from more recent wagering opportunities may be given more weight in a calculation for determining an odds adjustment.

As another example, such data may be used to determine that another offering at the particular odds and spread should be made because there is leftover demand on at least one side of a wagering opportunity. Such leftover demand may be referred to as latent demand and/or unmet demand. Such data may be considered an indication of interest in such a wagering opportunity and may be used to determine which wagering opportunities to offer in the future. For example, a same and/or similar wagering opportunity may be scheduled in response to a determination that there is greater than a threshold imbalance in risk in a prior offered wagering opportunity.

Such information may be desired by one or more other gaming operators. Such gaming operators may use such information, for example to determine odds, spreads, and/or other characteristics of wagers to offer (e.g., through sports books). In some embodiments, a gaming operator may sell such data to another gaming operator. Such sale may take place in an auction format (e.g., a slice of data going to a highest bidder), in a subscription format (e.g., sports books subscribe to a service to obtain a feed of such data), through an online marketplace, in person, through a website, and so on. In some embodiments, such sale may include a sale of a slice of date based on a time (e.g., data determined in a time period), based on an event (e.g., data about an event), based on a single wagering opportunity (e.g., data from a single wagering opportunity offering), based on a characteristic of wagering opportunities (e.g., data about wagering opportunities with similar characteristics), and so on. It should be recognized that sale of such data in slices and/or whole and/or methods of sales of such data may take any form and that examples given herein are non-limiting.

d. Information Obscurity

Some embodiments may include suppressing evidence of one or more pieces of data. Such suppression of evidence may include any desired action of information obscurity, misinformation, leakage prevention, and so on.

In some embodiments, a bettor or other user (e.g., an observer) may be able to determine an amount of a wager request that may be accepted if the bettor makes a wager request for a wagering opportunity. For example, a current amount at risk on each side of a wagering opportunity may be displayed or otherwise available to such a bettor. Such information and/or one or more business rules that may be known to a bettor may allow the bettor to determine the amount that may be accepted of a submitted wager request. Conversely, based on an amount accepted of a submitted wager request, the bettor may be able to determine the amount that was risked on another side of an offered wagering opportunity (e.g., if not all of a wager was accepted the bettor may determine how much demand was on the other side to result in the unaccepted amount), and/or the amount of imbalance that there may be in a marketplace. In some embodiments, knowledge of such demand and/or imbalance may provide a gaming operator with a competitive advantage (e.g., in setting lines), and/or may provide a revenue source (e.g., in selling such information to other gaming operators).

In some embodiments, it may be desired to prevent such information from being determined (e.g., without authorization and/or purchase) by a bettor and/or other user (e.g., a competing gaming operator). In some embodiments, evidence of such information may be suppressed to prevent such information from being determined. For example, in some embodiments, a random element may be introduced into a determination of risk to be accepted for one or more sides of a wagering opportunity. For example, a random number generator may be used to determine an amount to be accepted on a side of a wagering opportunity that was more risk in received wager requests. In a fully risk balancing embodiment, wager requests that are associated with the extra risk may be rejected. In some embodiments, some portion may be accepted even though such acceptance may imbalance a risk. In some embodiments, a determination of that portion may be based on a random number generation. For example, a random percentage of the risk may be accepted, a random percentage up to a random total amount may be accepted, a random total amount may be accepted, and so on. For example, in some embodiments, an imbalance on one side that has more risk may have some amount accepted that exceeds a perfect balance that ranges between 10 and 20% of an excess from another side. The amount between 10 and 20% may be determined at random. It should be recognized that any number of business rules may be applied to determine the amount and that any one or more of the business rules may include an element of randomness.

e. Examples of Odds, Spreads, and/or Other Characteristic Determinations

In some embodiments, one or more odds, spreads, and/or other characteristics for a wagering opportunity may be determined based on one or more other characteristics of such a wagering opportunity. In some embodiments, to make such a determination, data regarding sports book lines and/or other wagering opportunities may be used. In some embodiments, such determination may include converting one or more characteristics to one or more other characteristics using an analysis of an effect of a change to the characteristic (e.g., an effect that a change to one point in a spread has on an odds of a game). Such an analysis may include a mathematical analysis, a historical analysis, a Markov chain based analysis, a comparative analysis, machine analysis, a human analysis, a lookup table based analysis, and so on.

For example, odds offered on a Bears vs Packers game may be received from one or more sports books. Such received odds may be used to determine the odds for a wagering opportunity (e.g., the wagering opportunity's odds may be the received odds, some average, a consensus odds based on some weighting of received odds, and so on). For example, such odds for a wagering opportunity may include odds offered by a sports book associated with a gaming operator outside of an offering of the wagering opportunity.

Sports books or other gaming operators in Las Vegas, for example, may offer different odds for placing a wager on a particular game. Such sports books may generally offer a same point spread with somewhat different odds based on their own proprietary odds calculation methods. For example, one sports book may offer Bears+3.5 wagers at +109/−109 and another sports book may offer that Bears+3.5 wagers at +111/−111. Some embodiments may receive such odds information and determine odds for a wagering opportunity based on such information. For example, wagering opportunities with the same odds and/or spread of one or more of the received odds and/or spreads may be offered. As another example, a wagering opportunity with a consensus odds and/or spread may be offered.

As another example, such odds and/or spread information may be used as input to an algorithm for adjusting an odds and/or spread calculation of a gaming operator in determining future wagering opportunities in any desired manner.

In some embodiments, one or more desired point spreads may be determined for a wagering opportunity. Such point spread may include a previously offered point spread, a point spread offered by other gaming operators, a requested point spread, a point spread that is expected to draw wagers, and so on. For example, a determination may be made that for a Bears vs Packers game, a wagering opportunity with a point spread of +5.5 for the Bears may be offered. Such a determination may be made in any manner. For example, such a determination may be made in response to a request for such a wagering opportunity, based on prior leftover demand for such a wagering opportunity, based on demand in a prior wagering opportunity with same and/or similar spread, based on a desire to provide a variety of point spreads and prior point spreads offered, and so on. It should be recognized that such a point spread may be any number (e.g., whole, fractions, even, odd, zero, positive, negative, etc.).

In some embodiments, one or more conversions may be determined. Such a conversion may be used to convert an odds for a first point spread into an odds for a second point spread. Determining such a conversion may include determining a reference table that may take as input a first odds for a first spread and a desired spread and may output a desired odds for the desired spread. Such a conversion may be determined based on prior games involving one or more parties, movements in an odds offered by one or more sports books for the game as an offered point spread in the game changes, and/or any desired information. For example, if in prior games involving a same pair of teams, and/or a prior line offered, a single point increase in a spread resulted in a 10 point odds difference, then in a next game such information may be used to determine a price value of each point of a spread (e.g., 10 points).

In some embodiments, a conversion may include a value for a point and/or a fraction of a point in a spread (e.g., add 10 points in odds to team A and subtract 10 points from team B for each point in a spread). In some embodiments, a cost of each point may be same or similar at multiple spreads levels (e.g., 10 points for each point). In some embodiments, a different cost may apply to different spreads (e.g., the cost to change from a spread of 5.5 to 6.5 may be different than the cost to change from an 8.5 to a 9.5 spread). In some embodiments, a change for each team's odds may be same (e.g., 10 points to each team) and/or different.

In some embodiments, if odds for a first spread are determined in any manner, such odds may be converted using such a determined conversion. Some embodiments may include determining a desired odds for a desired spread based on an input odds (e.g., a consensus price, a price offered by a sports book) for an input spread. For example, an input odds and spread for a game of the Bears vs the Packers may include +3.5 and +110/−110 and a desired spread may include Bears +4.5. Based on a conversion method, the +3.5+110/−110 information may be converted into a price and spread pair of Bears +4.5+120/−120. It should be recognized that various method of determining and/or making a conversion of any odds (e.g., a consensus price) at a first spread to a desired odds at a desired spread may be used in various embodiments.

Some embodiments may include adjusting one or more odds and/or spreads based on determined wagering related data. For example, some embodiments may include adjusting odds and/or spreads in favor of one side of a future wagering opportunity if there was a leftover demand for wagers on the other side of a wagering opportunity in a prior wagering opportunity. In some embodiments, such an adjustment may be performed after a conversion, before a conversion, as part of a conversion. Such leftover demand may include an amount of requests, number of bettors, amounts wagered, and/or any other data regarding demand in a wagering opportunity. Odds may be determined based on such demand, for example, by adjusting odds to be less favorable to a team that has more demand in a two team event.

In some embodiments, an adjusted and/or converted odds and/or spread may be offered for a wagering opportunity. Such a wagering opportunity may include a desired spread offered at a desired price. In some embodiments, such a wagering opportunity may include a money line having no spread.

In some embodiments, a determination of odds for a game may be made or understood to be made based on a Markov chain or state based analysis. For example, given state A of the teams in the game, apply the state transition B that models play of the game, to state A, and receive state C, the conclusion of the game. Further examples of such state analysis are given for example, U.S. provisional application 61/405,354 to Amaitis, entitled "Inside Wagering" and filed Oct. 21, 2010, which has been incorporated herein by reference. In such state analysis, the probabilities determined by a matrix or other structure represented by state C may be used to determine prices for a wager on a game with a given spread. State C may represent a probability of each possible outcome occurring (e.g., the probabilities that the Bears will beat the Packers by each of a possible number of points and the probabilities that the Packers will beat the Bears with each of a possible number of points). State C may represent an expected outcome of a game that may have a highest probability. Such probability and/or probabilities may form a basis for prices of wagers on the outcome or outcomes represented by the state.

Figure 11:
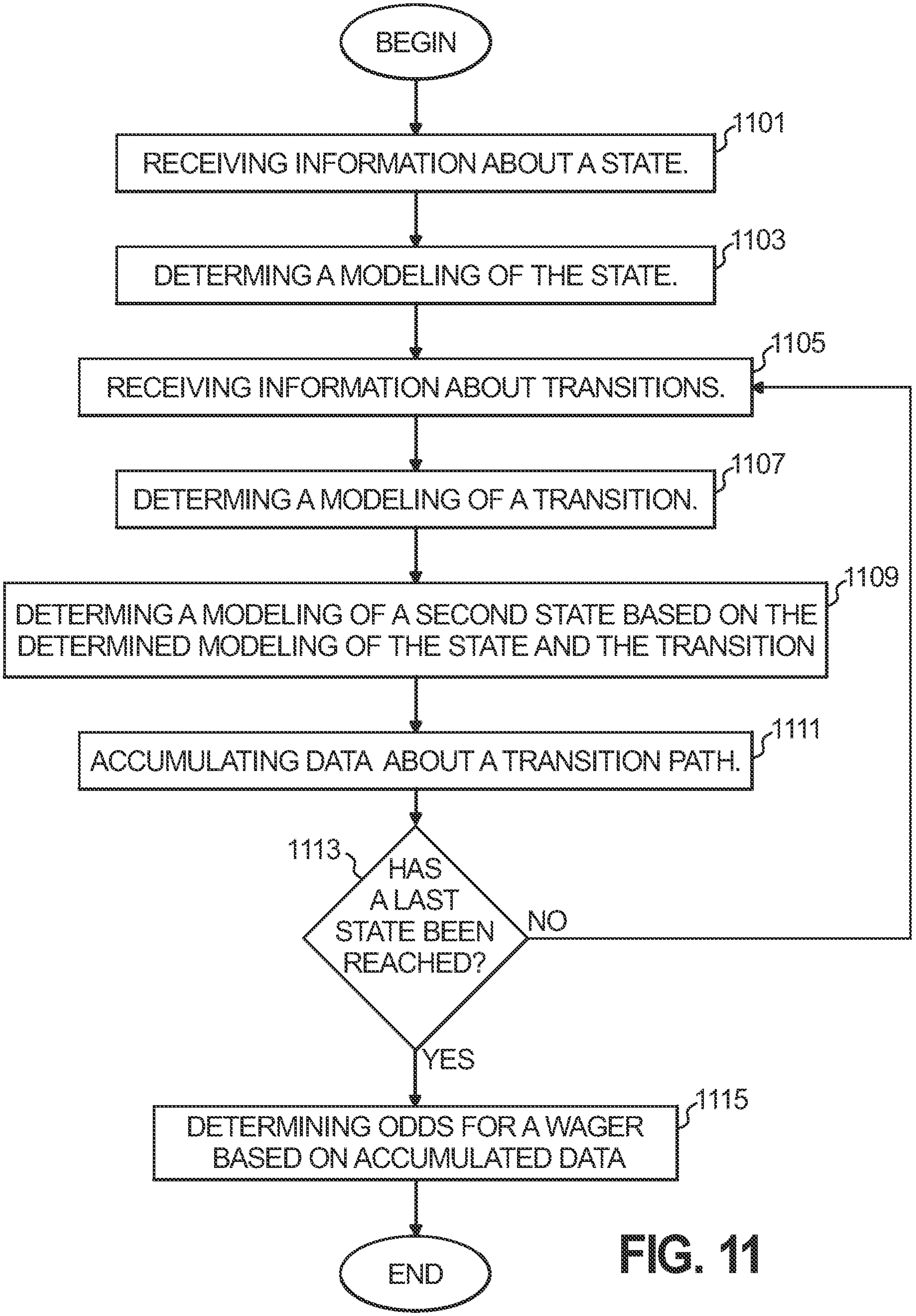
FIG. 11 illustrates an example method modeling a wager based on states that may be used in some embodiments.

FIG. 11 illustrates an example method that may be used to model one or more games based on a state analysis. The method may include receiving information about a state (e.g., 1101). The method may include determining a modeling of the state (e.g., 1103). The method may include receiving information about transitions (e.g., 1105). The method may include determining a modeling of a transition (e.g., 1106). The method may include determining a modeling of a second state based on the determined modeling of the state and the transition (e.g., 1109). The method may include accumulating data about a transition path (e.g., 1111). The method may include determining whether a last state of a series of possible states has been reached (e.g., 1113). If the last state has not been reached, the method may loop to block 1105. If the last state has been reached, the method may include determining odds for a wager based on accumulated data (e.g., 1115). It should be recognized that this method is given as a non-limiting example of modeling wagering opportunities based on state transitions.

In some embodiments, a gaming operator may receive an indication of odds for wagering on one possible outcome (e.g., from another gaming operator). Such information may provide information about the expectations of initial states and/or transition states used to reach the modeled outcome state that results in the odds and/or spread offered. In some embodiments, such state analysis may be used, in reverse, to determine a relationship between a state C embodied in a odds and/or spread into a different price and/or spread. For example, given state C and/or some of state C (e.g., an odds and/or spread that may represent state C), and knowing state A (e.g., based on public information about the teams), the values or some and/or all of the values of state B may be determined and/or refined using linear algebra and/or estimation. Such determination and/or refinement may then be used to determine a new odds and/or spread (e.g., by adjusting one or more values of a transition B and recalculating a state C based on such adjustments).

f. Custom Line Setting

Some embodiments may facilitate bettors establishing a custom wagering opportunity. For example, some embodiments may include an interface through which a bettor may submit a request that a wagering opportunity with a particular set of characteristics be offered in the future. Such a request may be submitted through an interface of a computing device. In response to such a request, a wagering opportunity may be offered and/or determined to be offered. In some embodiments, such a wagering opportunity may be offered in response to a number of such requests reaching a threshold number (e.g., within a time period).

In some embodiments such a request for a wagering opportunity may identify an amount that a bettor wants to wager. Such amount may be used to determine if the wagering opportunity should be offered (e.g., based on it exceeding a threshold, based on a comparison of the amount with other amounts identified and/or determined to be desired to be wagered in other wagering opportunities). In some embodiments, such a request may bind a bettor to wager such an amount if the wagering opportunity is offered.

Some embodiments may include receiving a request for a particular wagering opportunity. Such a request may identify one or more components of a desired opportunity. For example, such a request may identify a desired price and/or a desired spread. Such a request may identify a desired minimum wager, a desired maximum wager, a desired opening time, a desired closing time, a desired length, a desired game, and/or any desired characteristic. Such desires may influence a decision making for the offering of future wagering opportunities.

In some embodiments, an exactly requested wagering opportunity may not be offered, but a wagering opportunity that may be similar to a number of such requested opportunities may be determined and/or offered. For example, if a wager request for a +105 odds and another request for a +103 odds are both received, a +104 odds may be offered as an attempt to satisfy both such requests.

In some embodiments, a request for a wagering opportunity may identify a desired point spread for wagering opportunity based on a Bears vs Packers game (e.g., Bears +1.5). In some embodiments, a price for such a wagering opportunity may be determined in response to receiving such a request. Various examples of price determination are described elsewhere herein (e.g., conversion from another line). In response to receiving the request, a wagering opportunity with the desired spread and at the determined price may be offered. For example, the opportunity may be offered immediately after determining the characteristics, at a next available offering time, at a next unscheduled offering time, at some time in the future, at a requested time, and/or as desired.

In some embodiments, a request for a wagering opportunity at a first price may be received (e.g., for the Bears at +190). In some embodiments, a spread for such a wagering opportunity may be determined in response to receiving such a request. A spread may be determined, for example, by a conversion method by performing multiple conversions from one spread to possible other spreads to determine which spread is associated with a price that may be similar to the desired price. In some embodiments, a combination of spread and price may be selected that may be closes to the requested price, that may be closest without going over or under the price, and so on. In some embodiments, a spread associated with a close and/or closest price may be selected and offered with the price.

In some embodiments, a wagering opportunity having a determined and/or requested characteristics in any combination may be offered in response to receiving and/or determining the characteristic. As discussed elsewhere herein, such request for wagering opportunities may be part of data that may be collected and/or used in any manner by a gaming operator. It should be recognized that methods of performing such determination are given as non-limiting examples only.

g. Example System

Figure 12:
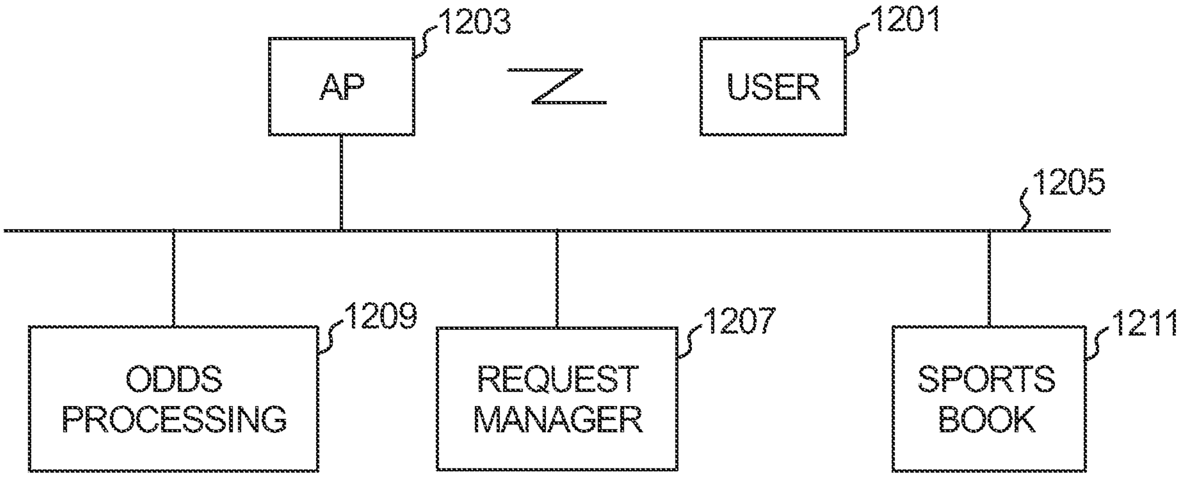
FIG. 12 illustrates an example system that may be used in some embodiments.

FIG. 12 illustrates an example system that may be used in some embodiments. Such a system may include any type of devices and/or people operating as desired in any combination.

Some embodiments may include a user device (e.g., computing device 1201). Such a device may include a kiosk, mobile device, touch pad, computer, cell phone, and so on as desired. Such a device may be operable to transmit information, receive input, display information, provide interfaces, receive transmissions, and so on.

Some embodiments may include a network access point (e.g., 1203). Such a device may allow access to a communication network. Such a device may include a wireless access point as illustrated that may allow a user device to access a wireless network through which gaming services may be provided. Such a device may include an edge router that may allow devices to access a communication network through which gaming services may be provided.

Some embodiments may include a local network (e.g., 1205). Such a local network may allow communication between an access point and one or more computing devices that may provide gaming services in combination and/or alone.

Some embodiments may include a request manager (e.g., 1207). Such a device may receive, process, accept, and/or perform any desired processes with respect to wager requests. For example, such a device may queue received wager requests, determine which wager requests to accept, and/or accept those wager requests, as desired.

Some embodiments may include an odds processing device (e.g., 1209). Such a device may calculate odds to be offered (e.g., based on request and/or other data, based on conversion, and so on). Such a device may make any determination of any characteristic for a desired wagering opportunity. In some embodiments such a device may process data to be sold and/or provided to outside sources as desired.

Some embodiments may include a sports book and/or other wagering opportunity managing device (e.g., 1211). Such a device may present information about wagering opportunities, make determinations about upcoming wagering opportunities, and so on. Such a device may allow traditional sports books wagers to take place through such a system.

Some embodiments may include any number of additional and/or alternative devices that may provide any desired capabilities. For example, some embodiments may include an auditing device, a history device, a settlement device, a location determination device, a connection to the Internet, and so on.

It should be recognized that this example system is given as a non-limiting example only and that other embodiments may include any desired methods and/or apparatus in any combination and/or arrangement as desired. For example, one or more processors may operate on information about wager requests, odds, wagering opportunities, event characteristics, requests for wagering opportunities, and so on in any manner to make a determination and/or produce an outcome. Such information may be stored in a database and/or memory location and/or received from an outside source.

XVI. Embodiments

The following should be understood as example embodiments and not as claims. It should be recognized that while various example embodiments of apparatus and/or methods are described herein that these example embodiments are non-limiting. No particular element is required, and various other embodiments may include any desired element(s) (e.g., apparatus, actions, methods, devices, etc.) whether described herein or not in any combination and/or arrangement. Some embodiments may include facilitating one or more actions and/or features and/or one or more devices configured to facilitating one or more actions and/or features.

A. An apparatus comprising: a tangible machine readable medium having stored thereon a plurality of instructions that when executed by a computing device cause the computing device to: offer, for a limited amount of time, a wagering opportunity defined by particular odds for each of at least two outcomes of an event, in which the particular odds are held constant throughout the amount of time; receive a plurality of respective first wager requests for wagers based on a first outcome of the at least two outcomes during the amount of time; receive a plurality of respective second wager requests for wagers based on a second outcome of the at least two outcomes during the amount of time, in which wagers related to the first outcome offset a risk associated with wagers related to the second outcome; and determine a respective first portion of a first wager request and a respective second portion of a second wager request to accept based on a cumulative risk of accepting both the first portion and the second portion.

A.1. The apparatus of claim A, in which offering the wagering opportunity includes: determining that the event has at least the two possible outcomes; determining a demand for the wagering opportunity associated with the event; determining that the wagering opportunity should be offered based on the demand; determining odds for each of the at least two outcomes for the wagering opportunity; determining a spread for the wagering opportunity; determining a start time for an offering of the wagering opportunity; determining the amount of time for the offering of the wagering opportunity; and transmitting information about the wagering opportunity at the start time.

A.1.1. The apparatus of claim A.1, in which determining the demand includes determining the demand based on at least one of a demand from a prior offered wagering opportunity, and a request for a wagering opportunity.

A.1.2. The apparatus of claim A.1, in which the outcomes are mutually exclusive.

A.2. The apparatus of claim A, in which each wager request may be received from a respective bettor, and in which the computing device is caused to login the respective bettor, present the respective bettor with an interface through which the respective bettor may submit information about the wager request, and confirm the wager request with the respective bettor.

A.2.1. The apparatus of claim A.2, in which the interface includes an interface of a mobile device.

A.3. The apparatus of claim A, in which determining the respective portions includes: determining a first risk for a house based on wagers placed on an event, in which the risk is based on an amount of money that the house may be obligated to pay if a first outcome of the event occurs; determining a second risk that the house may take on by accepting the first portion, in which the first portion is associated with the first outcome; determining a third risk that the house may take on by accepting the second portion, in which the second portion is associated with the second outcome, in which the third risk offsets at least a part of the first and second risks; and determining the first portion and the second portion that should be accepted to reduce a combined risk of the first risk and second risk offset by the third risk.

A.3.1. The apparatus of claim A.3, in which the first risk includes a risk from an imbalance in risk from a prior wagering opportunity.

A.3.2. The apparatus of claim A.3., in which the first portion and second portion are determined to minimize the combined risk.

A.3.3. The apparatus of claim A.3., in which the first portion and the second portion are determined such that the combined risk is within at least one of a desired percentage of total wagered amounts and a desired value.

A.4. The apparatus of claim A, in which the computing device is further caused to: form a first wager with a first bettor based on the first portion and a second wager with a second bettor based on the second portion.

A.4.1. The apparatus of claim A, in which the computing device is further caused to reject at least one second wager request based on a determination that accepting the second wager request would cause an imbalance in risk.

A.5. The apparatus of claim A.4, in which the determination of the first and second portion is made after the amount of time has passed.

A.6. The apparatus of claim A, in which the computing device is further caused to charge a commission for the second wager request that is based on the particular odds of the second wager request.

A.7. The apparatus of claim A, in which the computing device is further caused to record data regarding an imbalance in demand for wagers on the second outcome.

A.7.1. The apparatus of claim A.7, in which the computing device is further caused to: sell the data to a gaming provider.

A.7.2. The apparatus of claim A.7, in which the computing device is further caused to: use the data to determine a second wagering opportunity to be offered.

A.8. The apparatus of claim A, in which the computing device is further cause to receive a request for an offering of a second wagering opportunity with a second spread; determine an odds for the second wagering opportunity based on the spread, a spread of the first wagering opportunity, an odds of the first wagering opportunity, and a conversion between one spread and another spread; and offering the second wagering opportunity.

A.9. The apparatus of claim A, in which the apparatus further comprises the computing device.

A.9.1. The apparatus of claim A.9, in which the computing device includes a processor.

The invention claimed is:

1. An electronic device, comprising:

communication circuit configured to communicatively couple with external electronic devices;

at least one processor; and a memory storing programming instructions, wherein the programming instructions are executable by the at least one processor to cause the electronic device to:

generate, for offer during a first time period, a plurality of wagering opportunities based on a plurality of events occurring in the future, transmit, via the communication circuit, to an external electronic device, a first user interface (UI) for display in which each of the plurality of events is displayed for selection, responsive to receiving selection of a first event from among the plurality of events from the first UI, transmit to the external electronic device an instruction to remove the first UI so as to display a second UI, in which wagering opportunities associated with the selected first event are displayed for selection, responsive to receiving selection of a first wagering opportunity from the second UI, transmit to the external electronic device an instruction to overlay on a portion of the second UI a third UI in which the selected first wagering opportunity is customizable, wherein the third UI includes a selectable icon for submitting the first wagering opportunity after customization, and responsive to receiving indication of selection of the icon, confirming submission of the customized first wagering opportunity, wherein the first wagering opportunity is pooled with a first set of wagers, and determining for acceptance a first portion of the first set of wagers, and a second portion of a second set of wagers, based on calculating a cumulative risk of accepting both the first and second portions.

2. The electronic device of claim 1, further comprising:

upon receiving wagers associated with a future wagering opportunity, insert data indicative of the received wagers into a queue data structure stored in the memory; and when a future wagering opportunity is current so as to become a current wagering opportunity, removing the received wagers for the future wagering opportunity from the queue data structure.

3. The electronic device of claim 1, wherein the first UI includes a first section displaying selectable categories indicative of subsets of the plurality of events, and a second section displaying a first subset of the plurality of events matching a present category selected from among the first selection, and wherein calculating the cumulative risk includes offsetting a first risk associated with accepting the first portion of the first set of wagers by a second risk associated with accepting the second portion of the second set of wagers.

4. The electronic device of claim 3, wherein the first subset of the plurality of events is displayed within tiles organized as a grid-based arrangement within the second section of the first UI, and wherein the first risk originates from a risk imbalance caused by a preceding wagering opportunity.

5. The electronic device of claim 4, wherein each tile includes an icon representative of a type of an underlying event represented by the tile, and a time at which the underlying event will occur.

6. The electronic device of claim 1, wherein each wagering opportunity displayed within the second UI includes display of a name of an underlying event, a first start time of the underlying event, a second start time for initiation of inside wagering, a remaining time for inside wagering, and a type of bet.

7. The electronic device of claim 6, wherein the third UI is overlaid on the second UI such that a first portion of the name of the underlying event for each listed wagering opportunity is maintained on display, and a second portion of the name is removed from display.

8. The electronic device of claim 7, wherein the third UI includes display of a software-based number pad for inputting an amount for customizing of the first wagering opportunity.

9. The electronic device of claim 8, wherein the software-based number pad is removed during the confirming the submission of the customized first wagering opportunity.

10. A method in an electronic device, the method comprising:

generating, via at least one processor, for offer during a first time period, a plurality of wagering opportunities based on a plurality of events occurring in the future, transmitting, via a communication circuit, to an external electronic device, a first user interface (UI) for display in which each of the plurality of events is displayed for selection, responsive to receiving selection of a first event from among the plurality of events from the first UI, transmitting, via a communication circuit to the external electronic device, an instruction to remove the first UI so as to display a second UI, in which wagering opportunities associated with the selected first event are displayed for selection, responsive to receiving selection of a first wagering opportunity from the second UI, transmitting, via a communication circuit to the external electronic device, an instruction to overlay on a portion of the second UI a third UI in which the selected first wagering opportunity is customizable, wherein the third UI includes a selectable icon for submitting the first wagering opportunity after customization, and responsive to receiving indication of selection of the icon, confirming, via the at least one processor, submission of the customized first wagering opportunity, wherein the first wagering opportunity is pooled with a first set of wagers, and determining, via the at least one processor, for acceptance a first portion of the first set of wagers, and a second portion of a second set of wagers, based on calculating a cumulative risk of accepting both the first and second portions.

11. The method of claim 10, further comprising:

upon receiving wagers associated with a future wagering opportunity, inserting data indicative of the received wagers into a queue data structure stored in a memory; and when a future wagering opportunity is current so as to become a current wagering opportunity, removing the received wagers for the future wagering opportunity from the queue data structure.

12. The method of claim 11, wherein the first UI includes a first section displaying selectable categories indicative of subsets of the plurality of events, and a second section displaying a first subset of the plurality of events matching a present category selected from among the first selection, and wherein calculating the cumulative risk includes offsetting a first risk associated with accepting the first portion of the first set of wagers by a second risk associated with accepting the second portion of the second set of wagers.

13. The method of claim 12, wherein the first subset of the plurality of events is displayed within tiles organized as a grid-based arrangement within the second section of the first UI, and wherein the first risk originates from a risk imbalance caused by a preceding wagering opportunity.

14. The method of claim 13, wherein each tile includes an icon representative of a type of an underlying event represented by the tile, and a time at which the underlying event will occur.

15. The method of claim 10, wherein each wagering opportunity displayed within the second UI includes display of a name of an underlying event, a first start time of the underlying event, a second start time for initiation of inside wagering, a remaining time for inside wagering, and a type of bet.

16. The method of claim 15, wherein the third UI is overlaid on the second UI such that a first portion of the name of the underlying event for each listed wagering opportunity is maintained on display, and a second portion of the name is removed from display.

17. The method of claim 16, wherein the third UI includes display of a software-based number pad for inputting an amount for customizing of the first wagering opportunity.

18. The method of claim 17, wherein the software-based number pad is removed during the confirming the submission of the customized first wagering opportunity.

* * * * *